(12) United States Patent
German et al.

(10) Patent No.: US 10,384,879 B2
(45) Date of Patent: Aug. 20, 2019

(54) CONVEYOR BELT DRIVE SYSTEM AND CONFIGURATION

(71) Applicant: Dematic Corp., Grand Rapids, MI (US)

(72) Inventors: Harry T. German, Belding, MI (US); William P. Bray, Spring Lake, MI (US); Randall J. Carlson, Grand Rapids, MI (US); Benjamin J. Hekman, Holland, MI (US); William R. Stickland, Grandville, MI (US)

(73) Assignee: Dematic Corp., Grand Rapids, MI (US)

( * ) Notice: Subject to any disclaimer, the term of this patent is extended or adjusted under 35 U.S.C. 154(b) by 0 days.

(21) Appl. No.: 15/970,207

(22) Filed: May 3, 2018

(65) Prior Publication Data

US 2018/0319602 A1    Nov. 8, 2018

Related U.S. Application Data

(60) Provisional application No. 62/500,658, filed on May 3, 2017.

(51) Int. Cl.
*B65G 15/26* (2006.01)
*B65G 15/60* (2006.01)
(Continued)

(52) U.S. Cl.
CPC ............. *B65G 39/16* (2013.01); *B65G 15/60* (2013.01); *B65G 15/62* (2013.01); *B65G 23/44* (2013.01);
(Continued)

(58) Field of Classification Search
CPC ........ B65G 15/60; B65G 23/44; B65G 39/09; B65G 39/16; B65G 15/26; B65G 23/04; B65G 23/08; B65G 23/10; B65G 23/12
(Continued)

(56) References Cited

U.S. PATENT DOCUMENTS 1,168,865 A    1/1916  Drake
1,776,419 A *  9/1930  Dodge .................. B65G 23/00
                                                  198/497

(Continued)

FOREIGN PATENT DOCUMENTS

EP    1418139 A1 *  5/2004  ............ B65G 23/12
EP    1418139 B1    6/2008
(Continued)

OTHER PUBLICATIONS

International Search Report and Written Opinion of the International Searching Authority from corresponding Patent Cooperation Treaty (PCT) Application No. PCT/IB2018/053097, indicated completed on Aug. 23, 2018.

*Primary Examiner* — Mark A Deuble
(74) *Attorney, Agent, or Firm* — Gardner, Linn, Burkhart & Ondersma LLP

(57) ABSTRACT

A belt conveyor having a pair of side frames between which a belt is moved for conveying items includes a pair of idler rollers about which the belt is disposed for conveying items there between, a tension roller that is biased into engagement with the belt, and a driven roller operative to drive the belt about the idler and tension rollers. The tension and driven rollers are mounted between the side frames and are disposed lower than the idler rollers, with the tension roller mounted by a tensioner mount configured to impart a biasing force to the tension roller against the belt.

20 Claims, 17 Drawing Sheets

(51) Int. Cl.
*B65G 15/62* (2006.01)
*B65G 23/08* (2006.01)
*B65G 39/09* (2006.01)
*B65G 39/16* (2006.01)
*B65G 23/44* (2006.01)

(52) U.S. Cl.
CPC ............. *B65G 39/09* (2013.01); *B65G 15/26* (2013.01); *B65G 23/08* (2013.01)

(58) Field of Classification Search
USPC ................................................ 198/813–816
See application file for complete search history.

(56) References Cited

U.S. PATENT DOCUMENTS

| | | | |
|---|---|---|---|
| 2,875,888 A * | 3/1959 | Swain .................... | B65G 23/34 |
| | | | 198/318 |
| 3,088,581 A | 5/1963 | Rostal | |
| 3,456,773 A | 7/1969 | Titmas | |
| 3,470,668 A | 10/1969 | Lindstrom et al. | |
| 3,942,624 A | 3/1976 | Kupcikevicius | |
| 3,946,861 A | 3/1976 | Sandefur | |
| 4,249,661 A | 2/1981 | Lem | |
| 4,269,305 A | 5/1981 | Fryatt | |
| 4,318,513 A | 3/1982 | Martinez | |
| 4,372,440 A | 2/1983 | Ringis | |
| 4,413,982 A | 11/1983 | Foster | |
| 4,425,103 A | 1/1984 | Foster | |
| 4,458,403 A | 7/1984 | Foster | |
| 4,479,734 A | 10/1984 | Rother | |
| 4,500,304 A | 2/1985 | Foster | |
| 4,511,030 A | 4/1985 | Lem | |
| 4,538,949 A | 9/1985 | Liet et al. | |
| 4,557,707 A | 12/1985 | Thomey | |
| 4,601,683 A | 7/1986 | Foster | |
| 4,615,096 A | 10/1986 | Foster | |
| 4,624,652 A | 11/1986 | Foster | |
| 4,629,062 A | 12/1986 | Silverthorn et al. | |
| 4,634,408 A | 1/1987 | Foster | |
| 4,696,386 A | 9/1987 | Lem | |
| 4,708,697 A | 11/1987 | Foster | |
| 4,730,718 A | 3/1988 | Fazio et al. | |
| 4,887,992 A | 12/1989 | Dixon | |
| 4,926,999 A | 5/1990 | Fauth, Sr. et al. | |
| 4,930,623 A | 6/1990 | Johnson et al. | |
| 4,962,841 A | 10/1990 | Kloosterhouse | |
| 5,030,173 A * | 7/1991 | Bryant ................... | B65G 23/44 |
| | | | 474/136 |
| 5,042,644 A | 8/1991 | Davis | |
| 5,092,451 A | 3/1992 | Jones et al. | |
| 5,165,516 A | 11/1992 | Reed et al. | |
| 5,174,435 A | 12/1992 | Dorner et al. | |
| 5,180,504 A | 1/1993 | Johnson et al. | |
| 5,203,447 A | 4/1993 | Ewert | |
| 5,205,394 A | 4/1993 | Zeuschner | |
| 5,259,495 A | 11/1993 | Douglas | |
| 5,311,983 A | 5/1994 | Clopton | |
| 5,316,134 A | 5/1994 | Donohue | |
| 5,329,800 A | 7/1994 | Herdzina et al. | |
| 5,427,223 A | 6/1995 | Van Den Goor | |
| 5,435,429 A | 7/1995 | Van Den Goor | |
| 5,590,995 A | 1/1997 | Berkers et al. | |
| 5,632,372 A | 5/1997 | Steinbuchel et al. | |
| 5,641,056 A | 6/1997 | Lem | |
| 5,657,858 A | 8/1997 | Van Den Goor | |
| 5,667,054 A | 9/1997 | Van Den Goor | |
| 5,676,237 A | 10/1997 | Lem | |
| 5,695,042 A | 12/1997 | Van Der Burgt et al. | |
| 5,984,083 A | 11/1999 | Hosch et al. | |
| 6,109,427 A | 8/2000 | Hosch et al. | |
| 6,298,981 B1 | 10/2001 | Hosch et al. | |
| 6,315,110 B1 * | 11/2001 | Reymond ............... | B65G 21/14 |
| | | | 198/809 |
| 6,685,009 B1 | 2/2004 | Hosch et al. | |
| 6,843,365 B2 | 1/2005 | Baker | |
| 6,971,509 B2 | 12/2005 | Ertel et al. | |
| 7,134,544 B1 | 11/2006 | Kilper et al. | |
| 7,322,462 B2 * | 1/2008 | Landry ................... | B65G 23/44 |
| | | | 198/812 |
| 7,364,035 B2 * | 4/2008 | German ................. | B65G 13/07 |
| | | | 198/781.03 |
| 8,936,147 B2 * | 1/2015 | Knas ...................... | B65G 23/44 |
| | | | 198/814 |
| 8,983,652 B2 | 3/2015 | Nozaki | |
| 2005/0183932 A1 | 8/2005 | Angleitner | |
| 2016/0347548 A1 * | 12/2016 | Yamaji .................. | B65G 15/00 |

FOREIGN PATENT DOCUMENTS

| | | | | |
|---|---|---|---|---|
| GB | 1283963 A * | 8/1972 | .......... | B65G 47/261 |
| GB | 1283963 A | 8/1972 | | |
| GB | 1393672 A * | 5/1975 | ............. | B65G 23/12 |

* cited by examiner

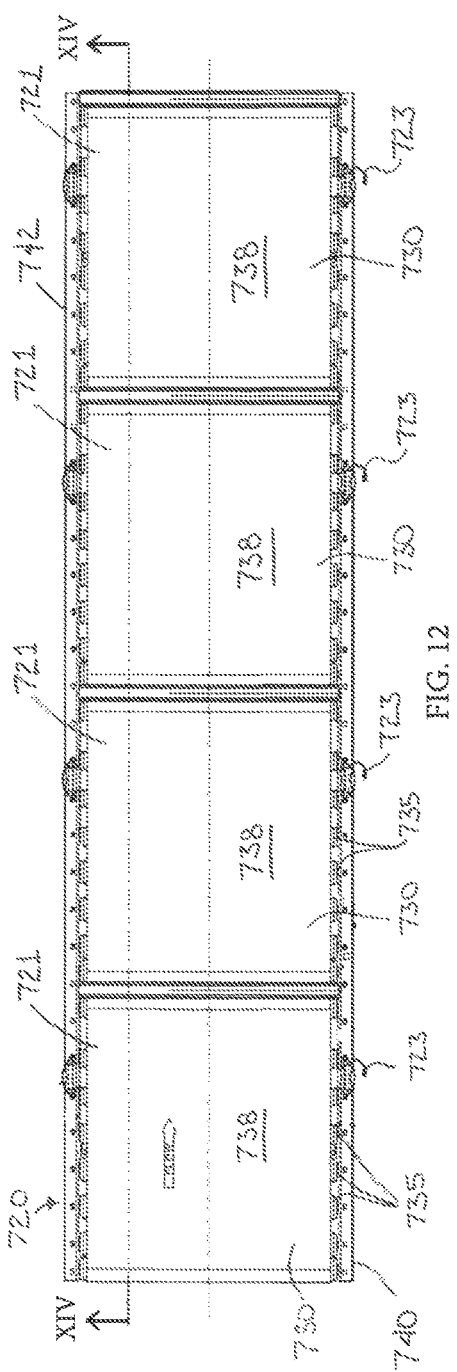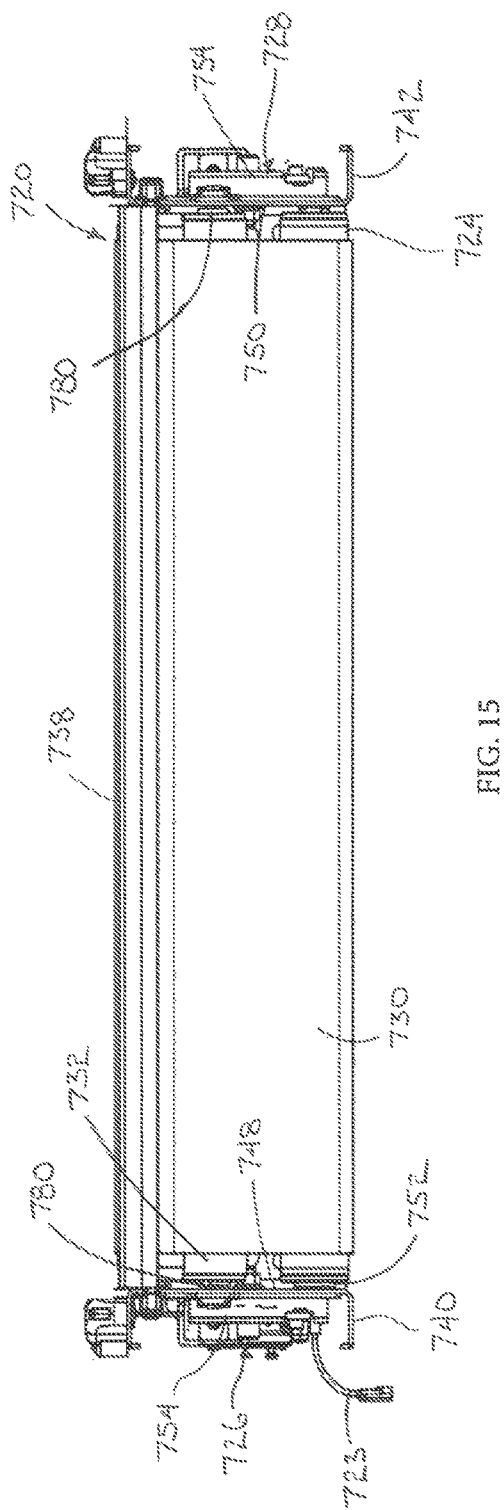

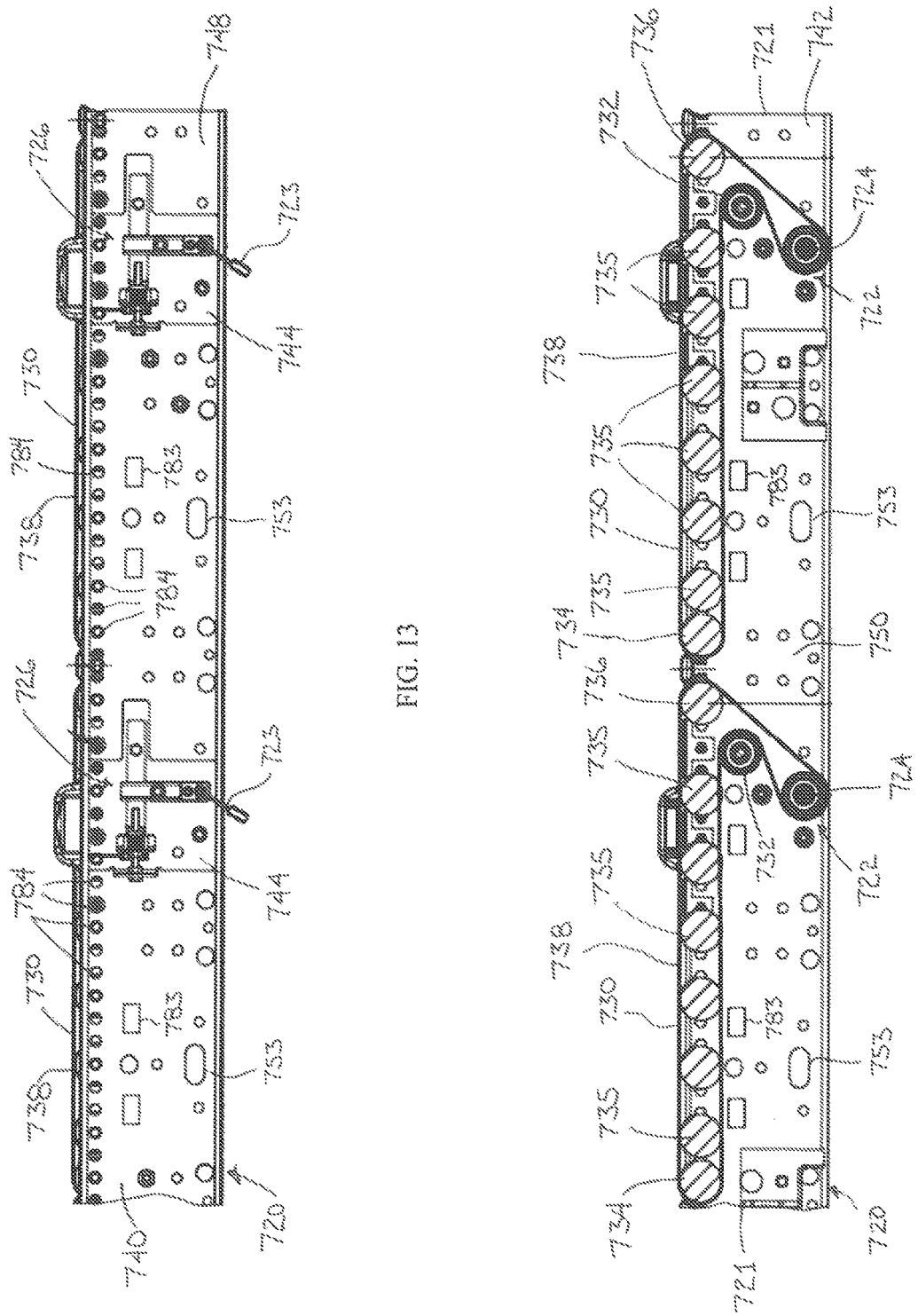

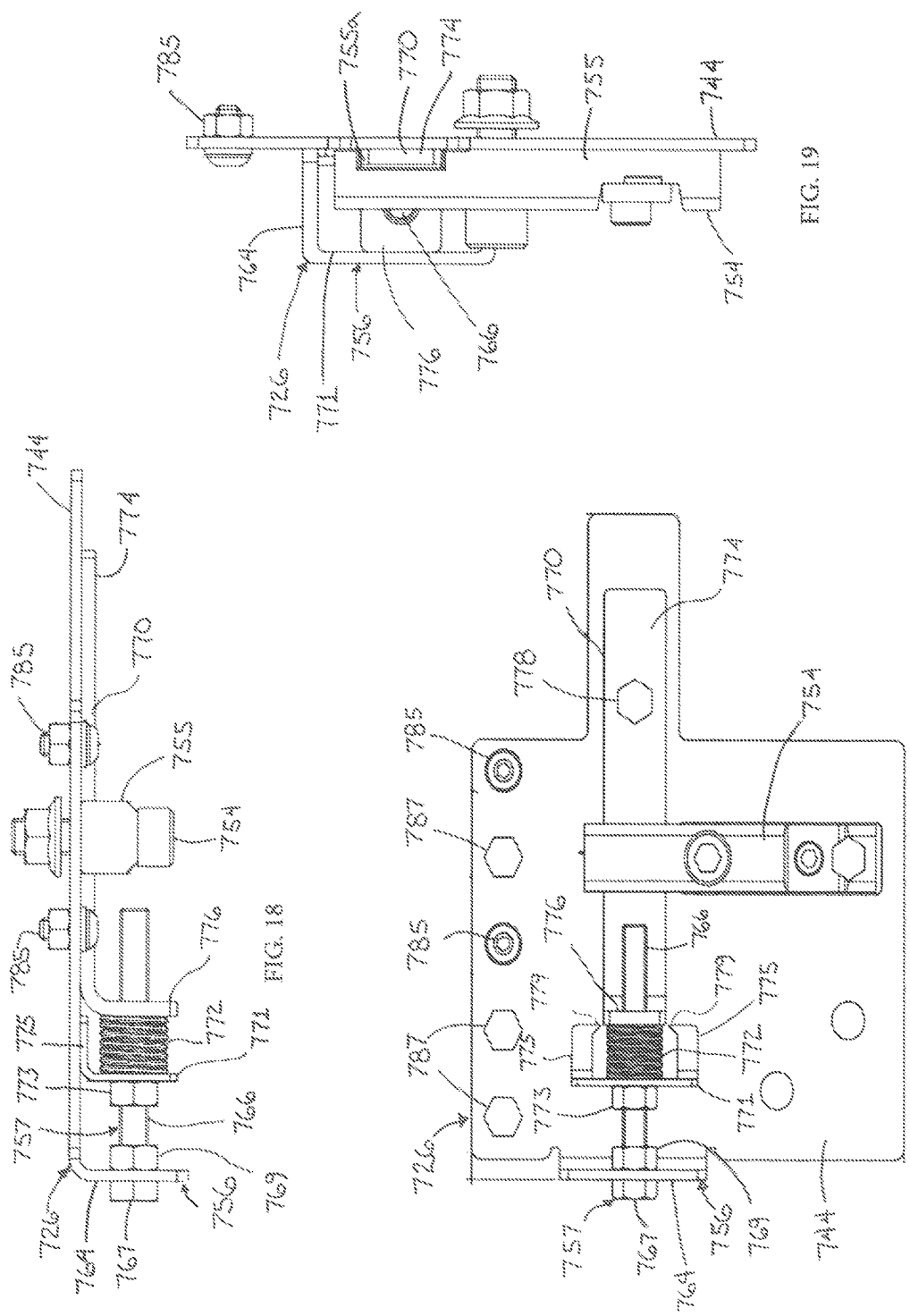

CONVEYOR BELT DRIVE SYSTEM AND CONFIGURATION

CROSS REFERENCE TO RELATED APPLICATION

The present application claims priority of U.S. provisional application Ser. No. 62/500,658 filed May 3, 2017, which is hereby incorporated herein by reference in its entirety.

BACKGROUND OF THE INVENTION

The present invention is directed to a drive system for a conveyor with a belt, and in particular a drive system employing a driven roller.

Belt conveyors are employed for conveying items, where belts are disposed around rollers. The rollers may include motorized rollers for driving the belts, where the motorized rollers are disposed at the conveyance plane of the conveyor. The belts of the conveyor may be disposed over multiple rollers or may be disposed over slider pans to define a conveying surface.

SUMMARY OF THE INVENTION

The present invention provides a belt conveyor having a pair of idler rollers between which packages are conveyed, as well as a drive system that drives the belt with a tension roller imparting tension force to the belt.

According to an aspect of the present invention, a belt conveyor having a pair of side frames between which a belt is moved for conveying items includes a drive system comprising a pair of idler rollers about which the belt is disposed for conveying items with the belt defining a conveyor surface between the idler rollers, a tension roller that is biased into engagement with the belt, and a driven roller operative to drive the belt about the idler and tension rollers, where the driven roller is a motorized self-driven roller.

In particular arrangements the axes of the tension roller and driven roller are disposed lower than a plane defined by the axes of the idler rollers in a normal orientation from the plane relative to the conveying surface, with the axis of the driven roller being lower than the tension roller, and with the tension roller being biased in a generally parallel orientation relative to the conveyor surface. Still further, the tension roller is mounted to the frame between the side frames by a tensioner mount that biases the tension roller against the belt. According to a particular aspect of the present invention, the tensioner mount is constructed as a pair of tension assemblies that are mounted to respective side frames, with each tension assembly including a tensioner supporting respective ends of the tension roller, and with the tensioners being adjustable to selectively adjust the biasing force of the tension roller into engagement with the belt. According to a still further arrangement, the tension assemblies each comprise a mounting plate mounted to respective ones of the side frames with the tension roller and the driven roller being mounted to and between the mounting plates. The mounting plate of the tension assembly may be secured to the outside of each of the side frames. Still further, the driven roller may be crowned to have a varying cross sectional diameter that is smaller at the respective ends and larger in a middle of the driven roller to aid the tracking of the belt.

The tensioners may further include a shaft support and a spring engaged with the shaft support, wherein a shaft of the tension roller is mounted to and between the shaft supports with the springs providing a biasing force to the tension roller via the shaft supports. Each tensioner further comprises a rod with the springs disposed over the rods and the rods engaged with the shaft supports, and with the tension assemblies each including a flange to which a respective rod is mounted.

The idler rollers are end idler rollers and a plurality of conveyor rollers and/or one or more slider pans may be disposed between the idler rollers, with the conveyor rollers and/or slider pans supporting the belt to define the conveyor surface. The idler rollers are cylindrical and free from crowns that may otherwise be used to track the belt, thus inhibiting the disorientation of objects being conveyed on the belt that may occur from such crowns.

The belt conveyor may be configured form a plurality of belt segments disposed between the side frames, where the belt segments each include the configuration of idler rollers, a tension roller and a driven roller.

The conveyor may be horizontally oriented, or configured in an incline or decline orientation, and include a sliding plate disposed between the idler rollers, with the belt sliding over the sliding plate when the belt conveys objects. In the case of an incline conveyor, a one way bearing may be provided at the uphill end idler roller to prevent the conveyor belt from moving backwards when the conveyor is stopped with objects thereon.

The conveyor and drive system in accordance with the present invention beneficially enable objects to be transported by the belt conveyor with reduced tension on the belt relative to a conventional conveyor belt arrangement, thereby requiring less power to operate the conveyor, reducing the stress on the various rollers, including a driven roller configured as a motorized self-driven roller, and increasing the useful life of the components of the conveyor. For example, the available torque for use in driving the system via the driven roller is increased. Still further, the conveyor provides increased performance in terms of the weight of loads on the conveyor and less expensive single-ply conveyor belts, such as laced belts, may be used on the conveyor in view of the reduced stress. Moreover, the conveyor may be operated at steep inclines or declines, and be anti-reversing (incline) or anti run away (decline). These and other objects, advantages, purposes and features of this invention will become apparent upon review of the following specification in conjunction with the drawings.

BRIEF DESCRIPTION OF THE DRAWINGS

FIG. 12 is a top elevation view of an alternative conveyor having a drive system for a belt conveyor in accordance with the present invention;

FIG. 13 is a partial side view of the conveyor of FIG. 12;

FIG. 14 is a partial side view of the conveyor of FIG. 12 taken along the line XIV-XV;

FIG. 15 is an end view of the conveyor of FIG. 12;

FIGS. 17-19 are side elevation, top and end views of a tension assembly of FIG. 16;

DESCRIPTION OF THE PREFERRED EMBODIMENTS

Figure 1:
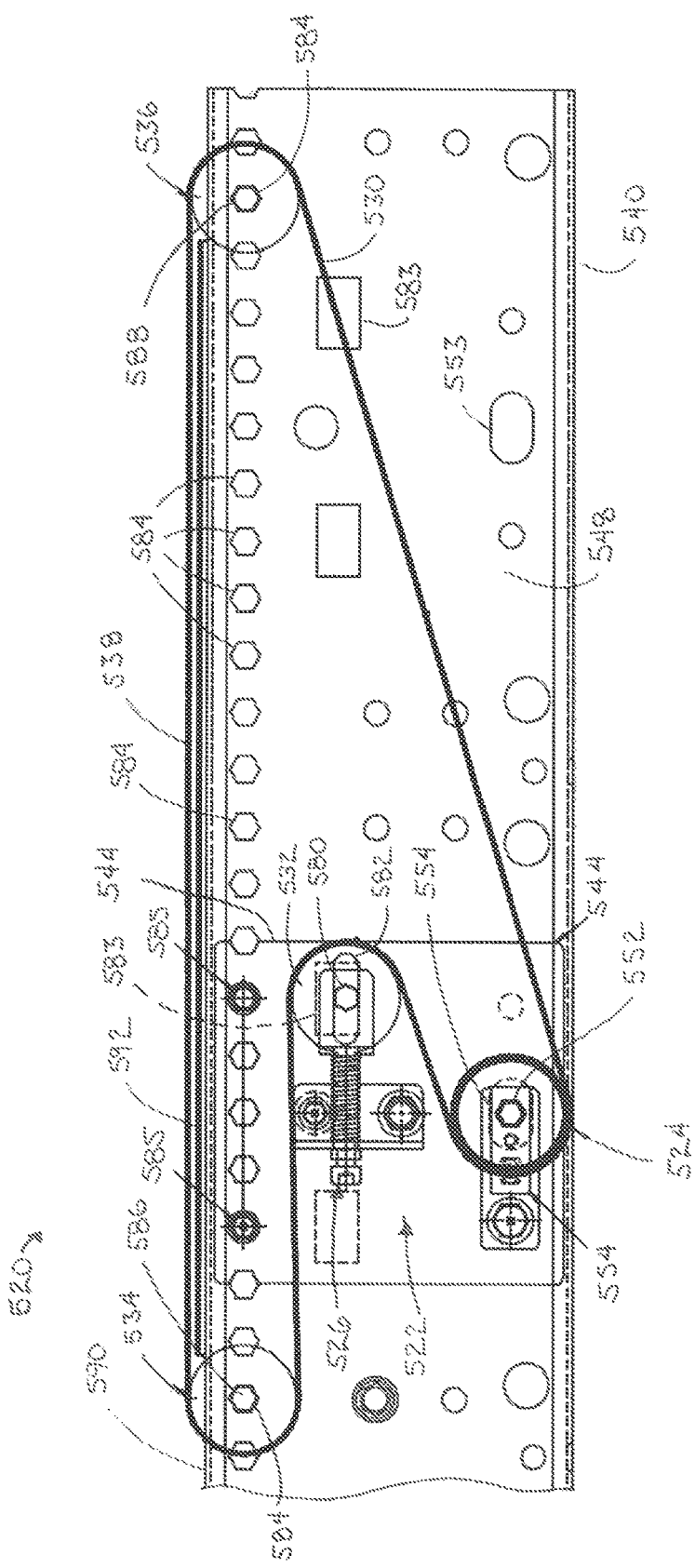
FIG. 1 is a side elevation view of a conveyor having a drive system for a belt conveyor in accordance with an aspect of the present invention.

The present invention will now be described with reference to the accompanying figures, wherein the numbered elements in the following written description correspond to like-numbered elements in the figures. A conveyor or conveyor segment 520 including a belt drive system 522 in accordance with aspects of the present invention is illustrated in FIG. 1. Drive system 522 includes a drive or driven roller 524 and a tensioner or assembly that includes a tensioner mount comprising a pair of opposed belt tension assemblies 526, 528, with an endless conveyor belt 530 disposed about driven roller 524 and a tension roller 532 disposed between tension assemblies 526, 528. Tension assemblies 526, 528 and roller 532 thus impart a desired tension to belt 530, as discussed below, to define or operate as a tension system or assembly for conveyor 520. Belt 530 is further disposed about a pair of idler rollers 534, between which the belt 530 forms a conveying surface 538 for objects to be moved by conveyor 520 in a conveying direction that extends longitudinally with conveyor 520. Drive system 522 beneficially enables objects to be transported by conveyor 520 with reduced tension on belt 530 relative to a conventional conveyor belt arrangement, thereby requiring less power to operate conveyor 520, reducing the stress on the various rollers, including driven roller 524, and increasing the useful life of the components of conveyor 520.

In the particular embodiment illustrated, driven roller 524 comprises a motorized drive roller that includes an internal motor construction for imparting driving rotation to roller 524. Roller 524 is mounted to the frame of conveyor 520, and in particular between side frames 540, 542, as well as between mounting plates 544, 546 associated with tension assemblies 526, 528, respectively. Side frames 540, 542 have generally outwardly oriented C-shaped profiles with vertical portions 548, 550 to which mounting plates 544, 546 are mounted, with mounting plates 544, 546 being disposed on outwardly oriented sides of the respective side frames 540, 542. As understood with reference to vertical portion 548 shown in FIG. 1, each vertical portion 548, 550 of side frames 540, 542 includes a repeating pattern of elongate upper apertures 583 and lower apertures 553, with mounting plates 544, 546 being mounted at selected ones of such apertures 583, 553. For example, drive roller 524 includes a shaft 552 that is mounted between frames 540, 542 and mounting plates 544, 546, with roller 524 being secured between frames 540, 542 via roller shaft mounts 554 that are disposed at apertures 553 of side frames 540, 542 and corresponding apertures (not shown) in mounting plates 544, 546, with the apertures of the mounting plates 544, 546 being aligned with side frame apertures 553. Roller shaft mounts 554 may comprise mounts as disclosed in U.S. Pat. No. 7,243,784, which is hereby incorporated herein by reference in its entirety.

Figure 3:
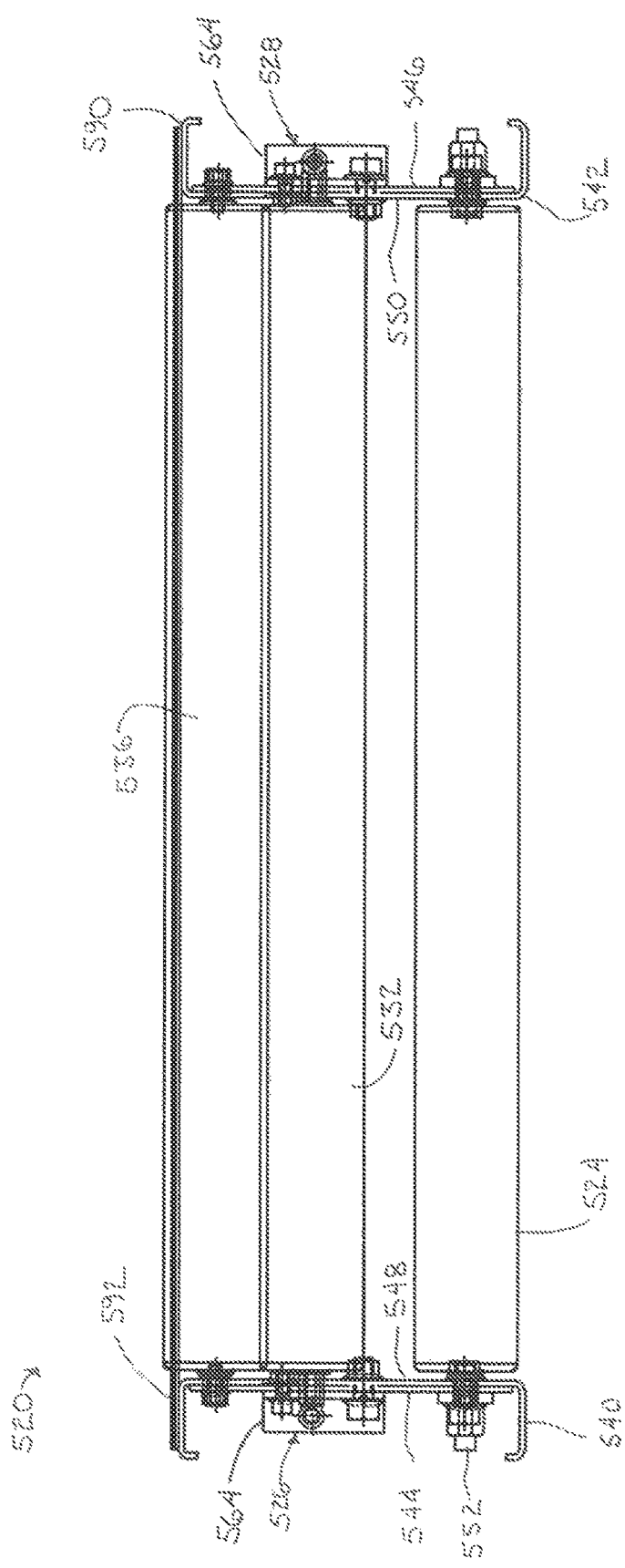
FIG. 3 is an end elevation view of the drive system of FIG. 1 shown with the belt removed.

It should be appreciated that in the illustrated embodiment tension assemblies 526, 528 are substantially similar, with assembly 528 shown in FIG. 3 being a mirror image of assembly 526. Due to their similarities, the present discussion focuses on tension assembly 526. It should therefore be appreciated that the discussion applies equally to the structure and operation of tension assembly 528.

Figure 2:
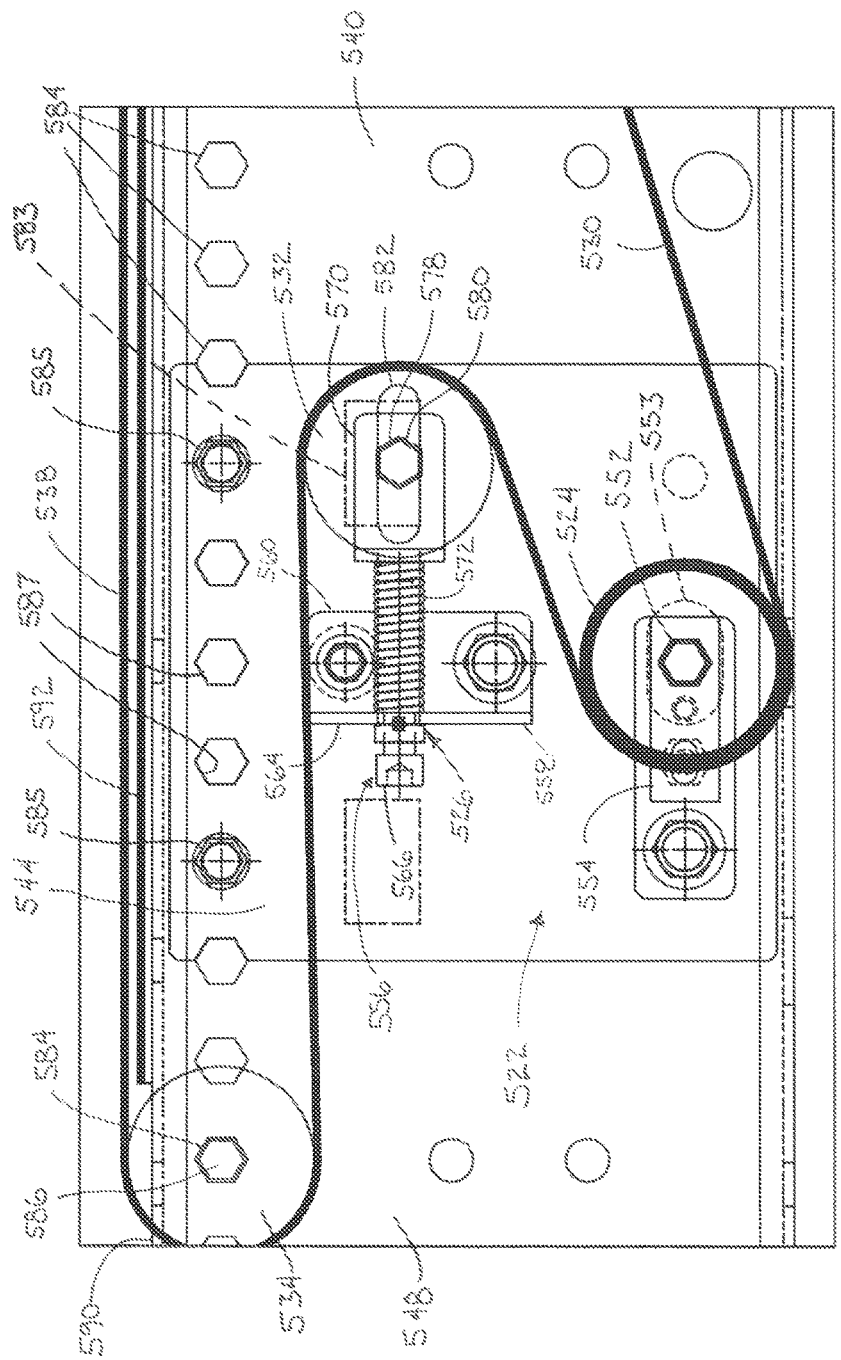
FIG. 2 is a close-up partial view of the drive system of FIG. 1.
Figure 4:
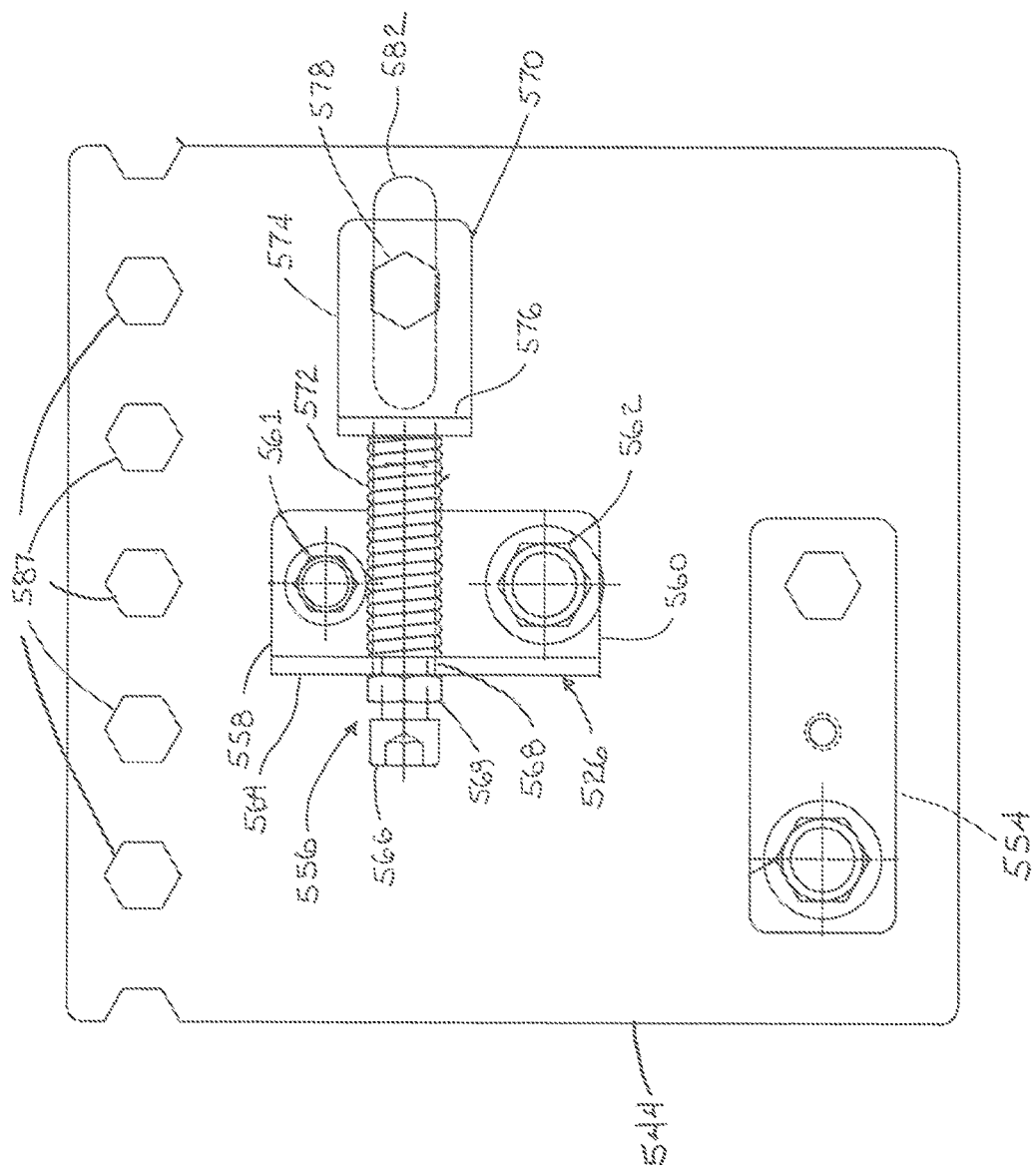
FIG. 4 is a close-up side elevation view showing a portion of a tension assembly of the drive system of FIG. 1.
Figure 5:
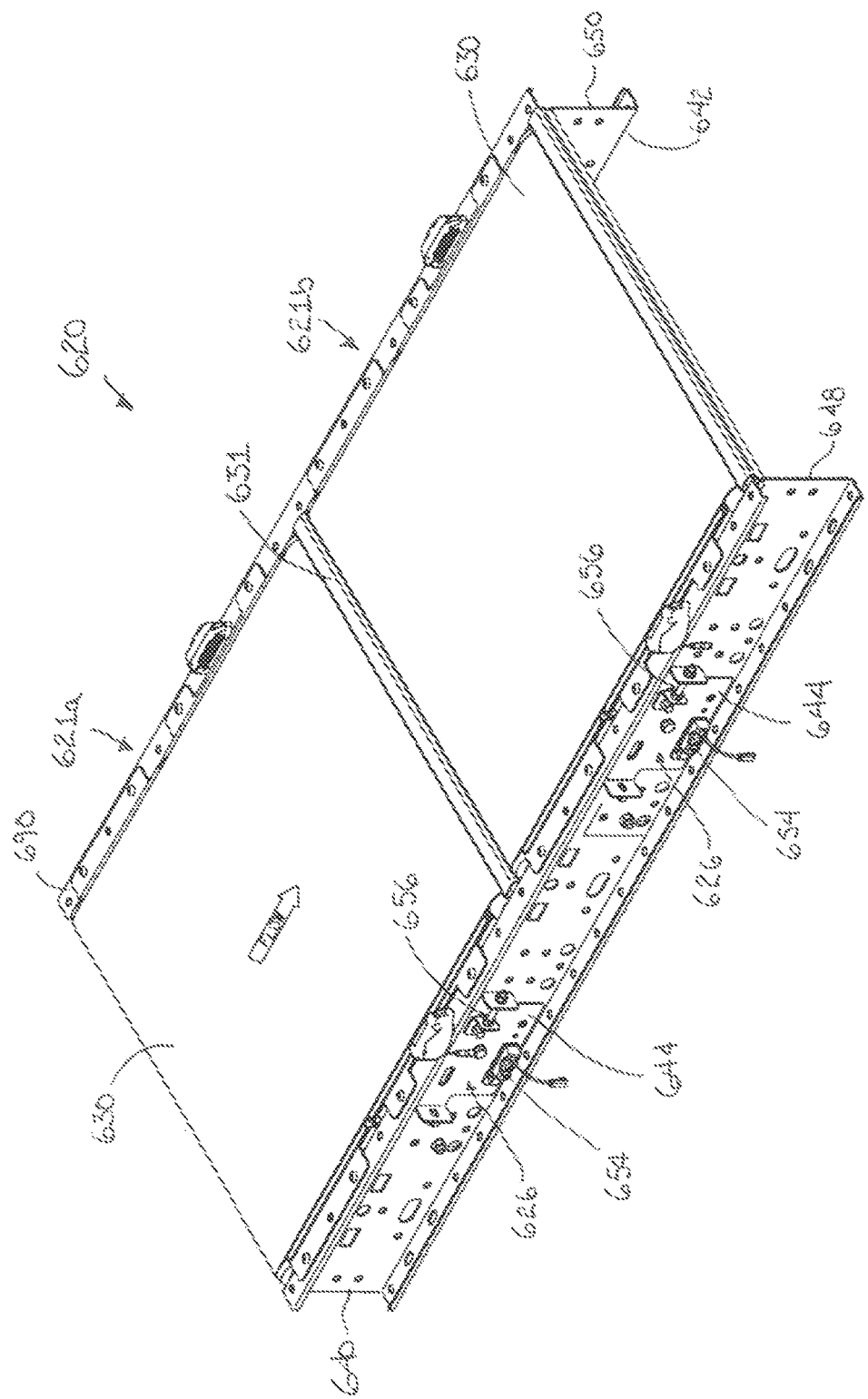
FIG. 5 is an isometric view of another conveyor having a drive system for a belt conveyor in accordance with aspects of the present invention.

Referring now to FIGS. 2 and 4, in addition to mounting plate 544, belt tension assembly 526 includes a biased shaft mount 556, with ends of tension roller 532 mounted between biased shaft mount 556 and the biased shaft mount (not shown) of tension assembly 528 to thereby bias tension roller 532 for imparting tension to belt 530.

Shaft mount 556 includes an L-shaped brace 558 secured to mounting plate 544, such as by leg 560 of brace 558 being secured to plate 544 by fasteners 561, 562. Brace 558 also includes a flange or leg portion 564 that extends outwardly relative to plate 544, such as at a generally right angle there from. A tensioner comprising a rod or threaded member, such as a screw or bolt 566 is passed through a threaded hole 568 in flange 564, with bolt 566 secured there against by a jam nut 569. Still further, the tensioner includes a shaft support 570 positioned so as to be located at an end of bolt 566, with the tensioner including a compression spring 572 disposed between leg portion 564 and shaft support 570. Shaft support 570 in turn comprises an L-shaped member having a first leg 574 and a second leg 576, with first leg 574 including a hexagon shaped aperture 578 for receiving the shaft 580 of tension roller 532, and with compression spring 572 biased against second leg 576 of shaft support 570 to thereby impart a biasing force. That is, spring 572 imparts a biasing force to shaft support 570 by way of spring 572 being fixed against flange 564 of shaft mount 556 and acting against second leg 576 of shaft support 570 to push shaft support 570 to the right with respect to the orientation of FIG. 4.

As best understood from FIG. 4, plate 544 includes an elongate aperture 582 configured as a slot with shaft support 570 being located proximate thereto, and in particular with aperture 578 of shaft support 570 being aligned with the elongate aperture 582 of the plate 544. When assembled, the shaft 580 of tension roller 532 is thus moveable or positionable or adjustable within and along elongate aperture 582. Still further, as best understood from FIGS. 1 and 2, side frame 540 also includes an elongate aperture 583, with the elongate aperture 582 of plate 544 configured to be aligned with aperture 583 of side frame 540 when plate 544 is mounted thereto. Although not shown, side frame 542 also includes a similar elongate aperture 583 for aligning with a similar elongate aperture 582 of plate 546 that is in turn aligned with the shaft support 570 of belt tension assembly

528. As noted, shaft 580 of tension roller 532 is mounted within apertures 578 of the shaft supports 570. Elongate apertures 582 and 583 thus enable tension roller 532 to be moved there along to be pushed against belt 530. In the illustrated embodiment, tension roller 532 is movable in an orientation that is generally parallel to the belt conveying surface 538.

Still further, the outer cylindrical surface of the motorized driven roller 524 may be crowned, whereby roller 524 has a varying diameter about the length of roller 524, with roller 524 having a slightly larger diameter in the middle relative to the diameter of the roller 524 at or adjacent the two ends proximate side frames 548, 550. The crowning aids in tracking of belt 530, where the crowning may be obtained by a heat shrink sleeve being placed on or over the roller 524. Tension roller 532 may additionally aid in the tracking of belt 530 by way of its spring mounting. Tension assemblies 526, 528, in addition to providing proper tension to belt 530, thus along with the crowned surface of roller 524 aid in promoting the proper tracking of belt 530 about drive system 522.

Referring now to FIGS. 1 and 2, idler rollers 534, 536 are mounted between side frames 548, 550, with side frames 548, 550 including apertures 584 that receive shafts 586, 588 of idler rollers 534, 536. As shown, idler rollers 534, 536 are mounted such that the outer perimeter of idler rollers 534, 536 extends above a top edge 590 of side frames 548, 550. Drive system 522 thus operates to drive belt 530 about idler rollers 534, 536, with belt 530 disposed or passing around the outer cylindrical surfaces of idler rollers 534, 536, as well as over the outer cylindrical surfaces of driven roller 524 and tension roller 532. Still further, plate 544 includes apertures 587 that align with apertures 584 of side frame 548 for mounting plate 544 thereto, such as via fasteners 585.

Of note is that in the illustrated embodiment idler rollers 534, 536 are beneficially formed to be cylindrical and thus form true cylinders. In contrast with other roller conveyor arrangements the idler rollers may be formed with one or more deformations or crowns that are used to promote the tracking of a belt conveyor thereabout. These deformations or crowns, however, can disorient objects being conveyed there over, including repeatedly disorient objects as the object is conveyed from conveyor segment-to-segment. This disorientation of objects can cause problems with the conveyor system, such as causing problems with automatically reading codes on the objects and/or discharging the objects from the conveyor system.

In the illustrated embodiment, with reference to FIG. 1, tension assemblies 526, 528 are disposed on the slack side of driven roller 524. Moreover, it should be appreciated that frames 548, 550 include multiple apertures 584, as shown, whereby idler rollers 534, 536 may be mounted in various locations along frames 548, 550, including to adjust the length between rollers 534, 536. It should be further appreciated that mounting plates 544, 546 may be disposed in various locations along side frames 548, 550. As understood from FIG. 1, the axes of idler rollers 534, 536 define a plane, with the axis of drive roller 524 and the axis of tension roller 532 being beneath or lower than the plane defined by the axes of idler rollers 534, 536 in a normal or perpendicular orientation from the plane relative to the conveying surface 538 of conveyor 520. Still further, in the illustrated embodiment, the axes of drive roller 524 is additionally lower or beneath the axes of tension roller 532 relative to conveying surface 538, with tension roller 532 being biased in a parallel orientation relative to conveying surface 538.

The drive system 522 enables belt 530 to be driven sufficiently to convey objects on and along belt 530 on conveying surface 538 between idler rollers 534, 536 with reduced or less overall tension to belt 530 relative to conventional conveyor belt systems, including conveyor belt systems employing motorized driven rollers. The reduced tension to belt 530 thus enables objects to be conveyed using less power, as there is less tension on belt 530 that would otherwise impart resistance to the various rollers. Still further, the lower tension on belt 530 results in less bending stresses being imparted to driven roller 524, where as noted driven roller 524 comprises a motorized self-driven roller, which in turn results in less stress to the internal components of the motorized driven roller. This further promotes increased useful life of the driven roller 524, and reduces likelihood of breakdowns during operation. Still further, belt 530 may thus be constructed of a single-ply material as it would be subject to less stress, enabling lower cost belts to be employed. For example, multi-ply belts are constructed to result in less stretch with a given amount of tension than compared to single-ply belts. The reduction in tension on the belt may thus enable the use of single-ply belts in conveying conditions that might otherwise mandate the use of a multi-ply belt. It should be appreciated that in particular operations multi-ply belts may be employed with conveyor 520 based on conveying requirements.

A slider pan or slider pan assembly 592 is disposed at or adjacent top edge 590 between idler rollers 534, 536 and beneath belt 530, with slider pan 592 slidingly supporting belt 530 to convey objects there along. Slider pan assembly 592 may be constructed to include a plastic layer disposed over a support plate, with the support plates being mounted to the side frames 540, 542. In the illustrated embodiment, plastic layers comprise an ultra-high-molecular-weight ("UHMW") polymeric material that is treated with a lubricant, such as impregnated with silicon. The belt 530 contacting upper surfaces of the plastic layers thus promotes the efficient movement of the belt 530 and items thereon over the slider pan assembly 592. Alternative constructions and configurations of slider pan assemblies may be employed to provide the low resistance to sliding of the inner surface of belt 530 over slider pan assemblies. This may include a metallic or plastic material that is coated or treated to promote the sliding of the belt over the slider pan assembly. For example, a nylon impregnated powder coat or paint may be applied to the surface of a slider pan assembly. Still further, a polytetrafluoroethylene ("PTFE") coating, such as TEFLON, or a wax material may be applied to the surface.

In the illustrated embodiment, conveyor 520 defines a conveyor section or zone that is approximately twenty four inches in length as established by the distance between idler rollers 534, 536, with belt being approximately two feet wide with an overall length of approximately sixty inches. It should be appreciated, however, that various configurations of conveyor 520 may be provided by way of the separation distance between idler rollers 534, 536. By way of example only, conveyor zones formed by a drive system in accordance with the disclosed system may be constructed to be between eighteen inches to forty-eight inches in length.

Still further, although conveyor 520 is illustrated in a generally horizontal matter, conveyor 520 may be advantageously used in incline or decline arrangements whereby conveyor 520 is oriented to convey objects in either a generally upward or downward orientation. A conveyor 520 may, by way of example, be oriented at an incline or decline angle of approximately +/−18 degrees from horizontal. It should be appreciated that the angle of conveyor 520 may be based on the size, type and/or weight of object or objects thereon, with the angle being limited to prevent inadvertent tumbling of the object.

In particular embodiments of an angled incline or decline conveyor 520, when the conveyor 520 is stopped with objects thereon that the drive system 524 may provide sufficient resistance to unwanted movement of belt 530 based on the gravitational weight of the objects thereon from imparting a downward force to belt 530 to cause it to rotate about the various rollers. That is, the resistance of driven roller 524 to rotating, together with the resistance imparted by belt tension assemblies 526, 528, may itself be sufficient to prevent such unwanted movement. It should be appreciated, however, that depending on the angle of conveyor 520 and the size, type and/or weight of the objects being transported thereon, that a one-way clutch in the case of incline applications or a brake in the case of decline applications may be incorporated into conveyor 520 to inhibit unwanted motion of belt 530 when driven roller 524 is not activated to drive belt 530. In the case of a brake, for example, the brake may be actuated or engaged whenever driven roller 524 is stopped or deactivated.

Referring now to FIGS. 5-11, an alternatively configured conveyor or conveyor segment 620 having a pair of belt drive systems 622 (FIG. 8) is shown that includes various similar components and features to conveyor 520 and belt drive system 522 discussed above, with the similar components of conveyor 620 being identified with "100" added to the like reference numerals of conveyor 520. It should be appreciated that due to the similarity of conveyor 620 with conveyor 520, not all of the similar components and features are discussed with respect to the system of FIGS. 5-11.

Figure 9:
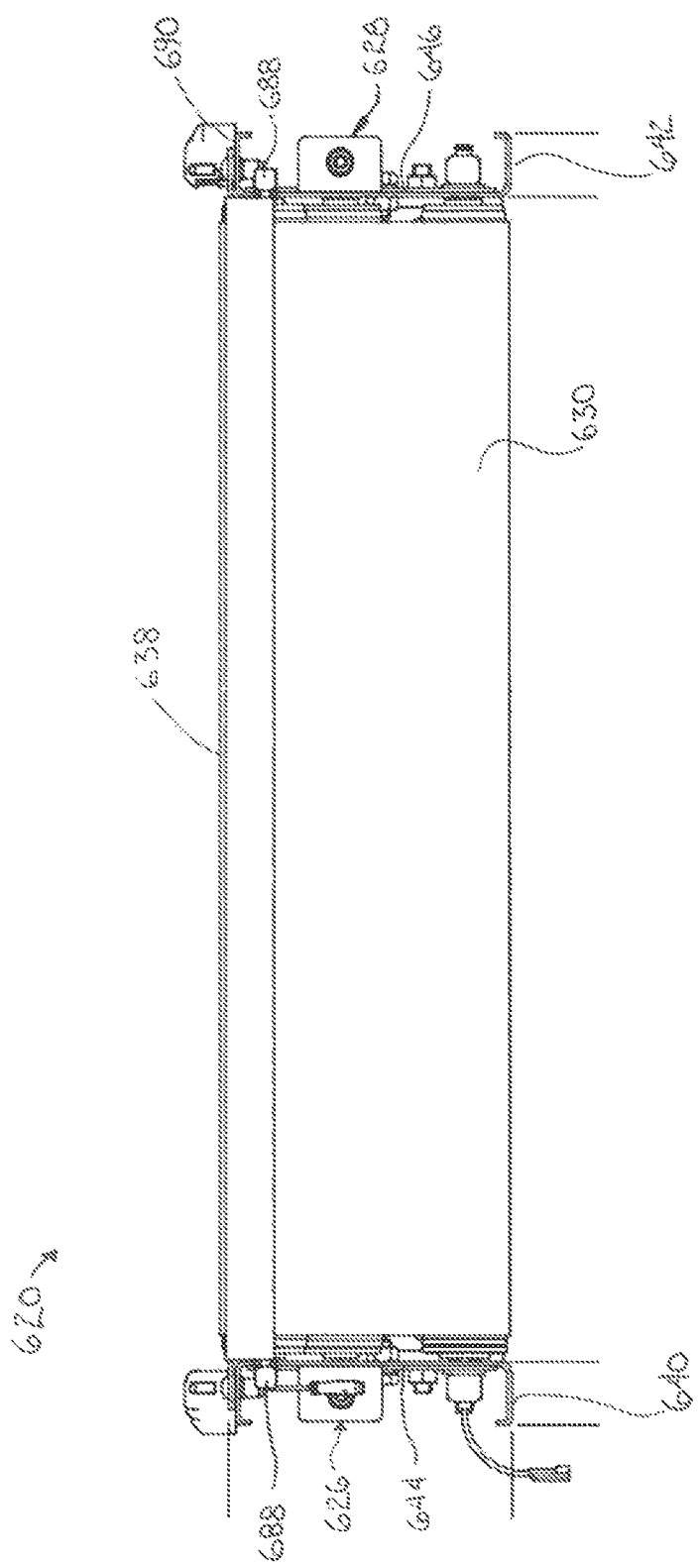
FIG. 9 is an end elevation view of the drive system of FIG. 5.

Each drive system 622 includes a drive or driven roller 624 and a tensioner mount comprising a pair of belt tension assemblies 626, 628, with an endless conveyor belt 630 disposed about driven roller 624 and a tension roller 632 disposed between tension assemblies 626, 628 (see also FIG. 9). Tension assemblies 626, 628 and roller 632 cooperatively impart a desired tension to belt 630, as discussed below, to define or operate as a tension assembly for conveyor system 620. Belt 630 is further disposed about a pair of idler rollers 634, 636 between which the belt 630 forms a conveying surface 638 for objects to be moved by conveyor 620 in a longitudinal conveying direction, as indicated in FIG. 1. As with drive system 522, drive system 622 enables objects to be transported with reduced tension on belt 630, thereby requiring less power to operate conveyor 620, reducing the stress on the various rollers, including driven roller 624, and increasing the useful life of the components of conveyor 620.

Driven roller 624 comprises a motorized drive roller that includes an internal motor construction for imparting driving rotation to roller 624. Roller 624 is mounted between side frames 640, 642, as well as between mounting plates 644, 646 of tension assemblies 626, 628, respectively. Mounting plates 644, 646 are mounted to the outwardly oriented vertical side portions 648, 650 of the C-shaped frames 640, 642. Roller 624 includes a shaft 652 that extends through apertures in side frames 640, 642 and mounting plates 648, 646, with roller 624 being secured between frames 640, 642 via roller shaft mounts 654, where roller shaft mounts 654 may comprise mounts as disclosed in U.S. Pat. No. 7,243,784.

It should be appreciated that in the illustrated embodiment tension assemblies 626, 628 are substantially similar, with mounting plates 648, 646 being identical for use on either side frame 640, 642, whereby assembly 628 would be a mirror image of assembly 626. Due to their similarities, the present discussion focuses on tension assembly 626. It should therefore be appreciated that the discussion applies equally to the structure and operation of tension assembly 628.

Figure 10:
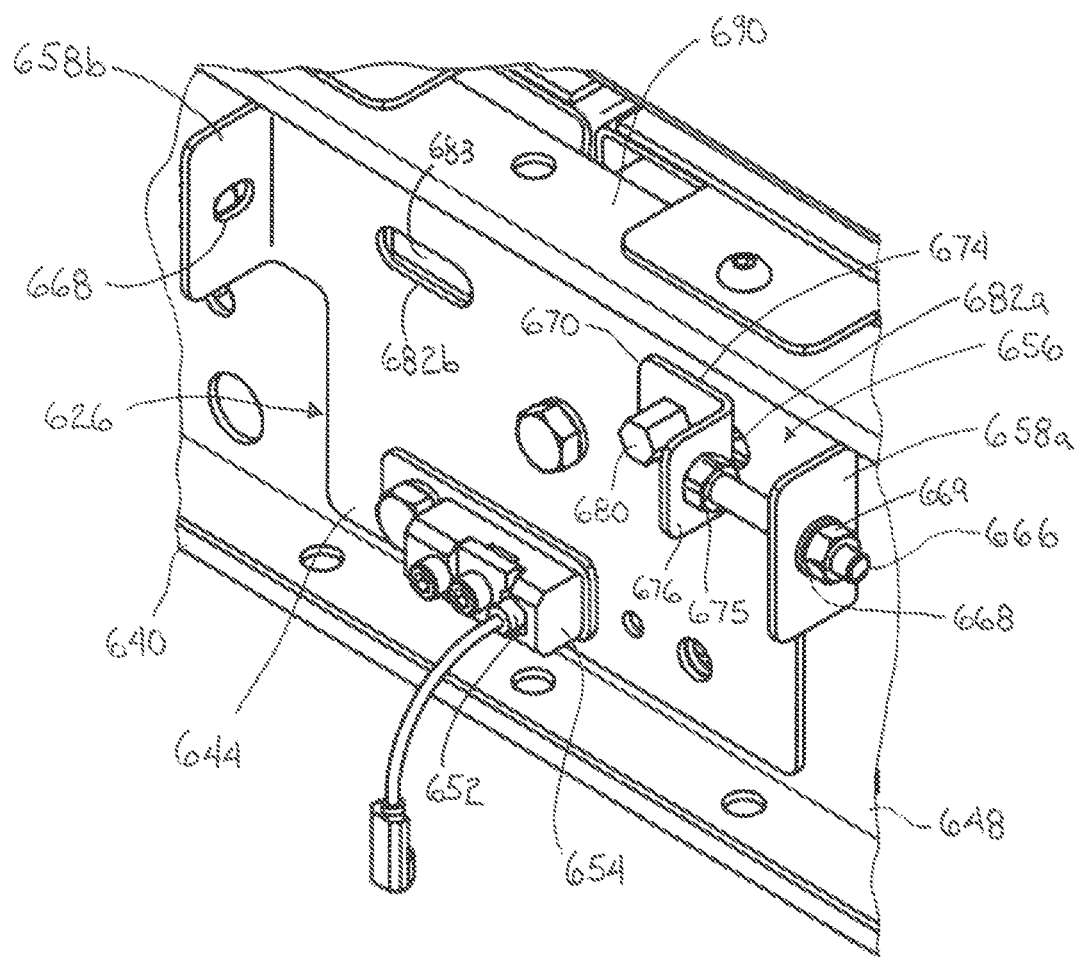
FIG. 10 is a close-up partial view showing a portion of a tension assembly of the drive system of FIG. 1 mounted to a side frame of the conveyor.
Figure 11:
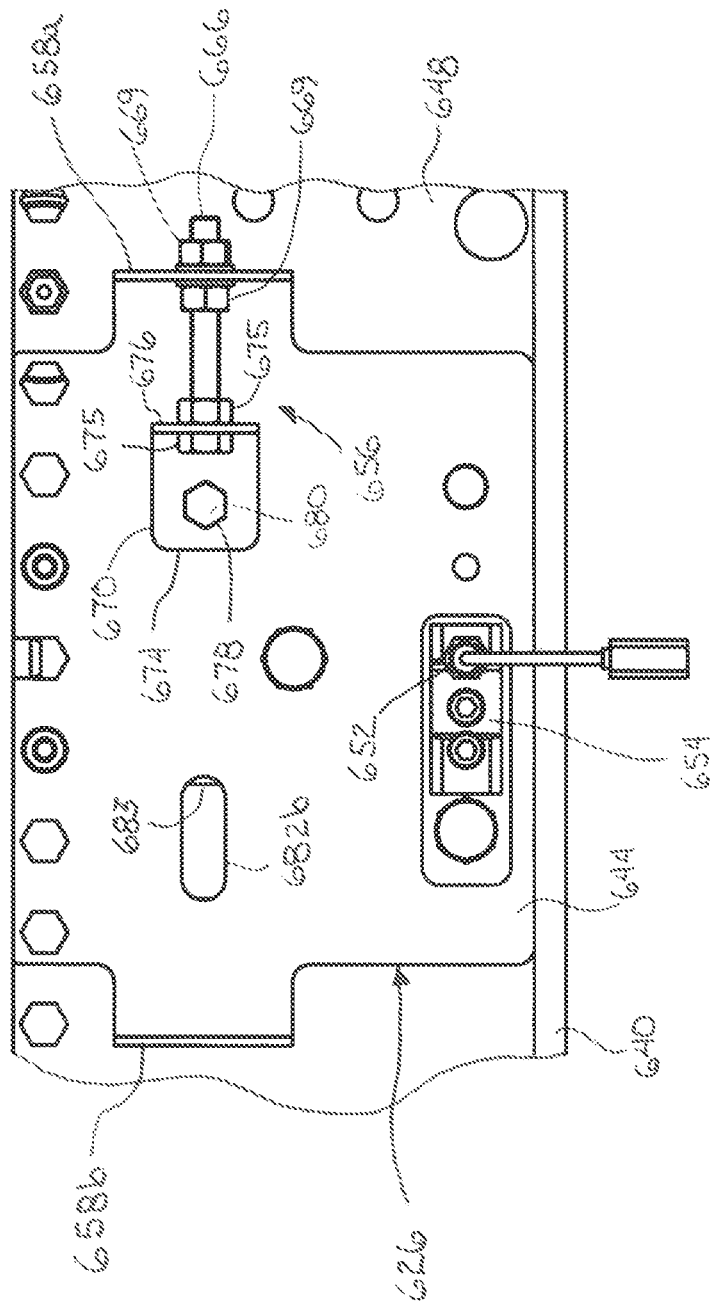
FIG. 11 is a side elevation view of the view of FIG. 10.

Referring now to FIGS. 10 and 11, in addition to mounting plate 644, belt tension assembly 626 includes a biased shaft mount 656, with tension roller 632 mounted between biased shaft mount 656 and the biased shaft mount (not shown) of tension assembly 628 to thereby bias tension roller 632 for imparting tension to belt 630. Mounting plate 644 includes a pair of integral L-shaped braces, flanges or tabs 658a, 658b that form perpendicular leg portions formed or disposed on opposite longitudinal ends of plate 644 by being bent at a generally right angles to the central portion of plate 644. As understood from FIG. 10, tab 658a forms part of shaft mount 656. It should be appreciated that tab 658b of the mounting plate 646 forms part of the shaft mount for the opposite tension assembly 628.

A tensioner comprising a rod or threaded member, such as a screw or bolt 666 is passed through a hole 668 in flange 658a (see hole 668 in flange 658b), with bolt 666 secured against flange 658a by nuts 669. The tensioner further includes a shaft support 670 positioned so as to be located at an end of bolt 666. Shaft support 670 in turn comprises an L-shaped member having a first leg 674 and a second leg 676, with first leg 674 including a hexagon shaped aperture 678 (FIG. 10) for receiving the shaft 680 of tension roller 632, and bolt 666 being held to second leg 676 by nuts 675. In operation, shaft support 670 is drawn towards flange 658a in order to impart a biasing force by drawing shaft support 670 to the right with respect to the orientation of FIG. 11, and thereby in turn cause tension roller 632 to push against belt 630 to tension belt 630.

As best understood from FIG. 10, plate 644 includes an elongate aperture 682a with shaft support 670 being located proximate thereto, and in particular with aperture 678 of shaft support 670 being aligned with the elongate aperture 682a of the plate 644. Of note is that aperture 682a is substantially similar to aperture 682b. Still further, as best understood from FIGS. 7 and 10, side frame 640 also includes elongate apertures 683, with the elongate aperture 682a of plate 644 configured to be aligned with a respective one of the apertures 683 of side frame 640 when plate 644 is mounted thereto. Side frame 642 also includes a similar elongate aperture 683 (FIG. 8) for aligning with a similar elongate aperture 682b of plate 646 that is in turn aligned with the shaft support 670 of belt tension assembly 628. As noted, shaft 680 of tension roller 632 is mounted within apertures 678 of the shaft supports 670. Elongate apertures 682a, 682b and 683 thus enable tension roller 632 to be moved along the side frames and thus be pushed against belt 630. In the illustrated embodiment, tension roller 632 is movable in an orientation that is generally parallel to the belt conveying surface 638.

The outer cylindrical surface of drive roller 624 is crowned to aid in tracking of belt 630. Tension assemblies 626, 628, in addition to providing proper tension to belt 630, thus along with the crowned surface of roller 624 aid in promoting the proper tracking of belt 630 about drive system 622.

Figure 8:
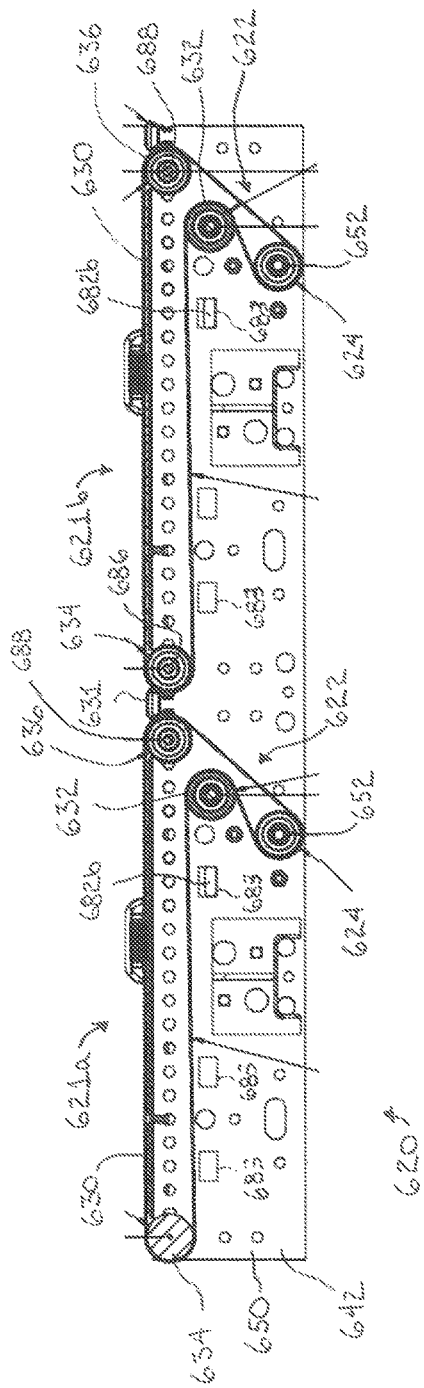
FIG. 8 is a side cross-sectional view of the conveyor of FIG. 5 taken along the line VIII-VIII of FIG. 6 showing the drive system.

Referring now to FIG. 8, idler rollers 634, 636 are mounted between vertical portions 648, 650 of side frames 640, 642, with side frame portions 648, 650 including apertures 684 that receive shafts 686, 688 of idler rollers 634, 636. As shown, idler rollers 634, 636 are mounted such that the outer perimeter of idler rollers 634, 636 extends above a top edge 690 of side frames 648, 650. Drive system 622 thus operates to drive belt 630 about idler rollers 634, 636, with belt 630 disposed or passing around the outer cylindrical surfaces of idler rollers 634, 636, as well as over the outer cylindrical surfaces of driven roller 624 and tension roller 632. In the illustrated embodiment, with reference to FIG. 8, tension assemblies 626, 628 are disposed on the slack side of driven roller 624. As also understood from FIG. 8, the axes of idler rollers 634, 636 define a plane, with the axis of drive roller 624 and the axis of tension roller 632 being beneath or lower than the plane defined by the axes of idler rollers 634, 636 in a normal or perpendicular orientation from the plane relative to the conveying surface 638 of conveyor 620. Still further, in the illustrated embodiment, the axes of drive roller 624 is additionally lower or beneath the axes of tension roller 632 relative to conveying surface 638. As also understood from FIGS. 6 and 8, idler roller 634 comprises an initial or incoming roller and idler roller 636 comprises an end or outgoing roller for the conveying surface 638, with tension roller 632 being biased in a parallel orientation relative to conveying surface 638.

The drive system 622 enables belt 630 to be driven sufficiently to convey objects on and along belt 630 on conveying surface 638 between idler rollers 634, 636 with reduced or less overall tension to belt 630, which thus enables objects to be conveyed using less power as there is less tension on belt 630 that would otherwise impart resistance to the various rollers. This further results in less bending stresses being imparted to driven roller 624, where as noted driven roller 624 comprises a motorized self-driven roller, which in turn results in less stress to the internal components of the motorized driven roller. This further promotes increased useful life of the driven roller 624, and reduces likelihood of breakdowns during operation. Still further, belt 630 may thus be constructed of a single-ply material as it would be subject to less stress, enabling lower cost belts to be employed. For example, multi-ply belts are constructed to result in less stretch with a given amount of tension than compared to single-ply belts. The reduction in tension on the belt may thus enable the use of single-ply belts in conveying conditions that might otherwise mandate the use of a multi-ply belt. It should be appreciated that in particular operations multi-ply belts may be employed with conveyor 620 based on conveying requirements.

Figure 6:
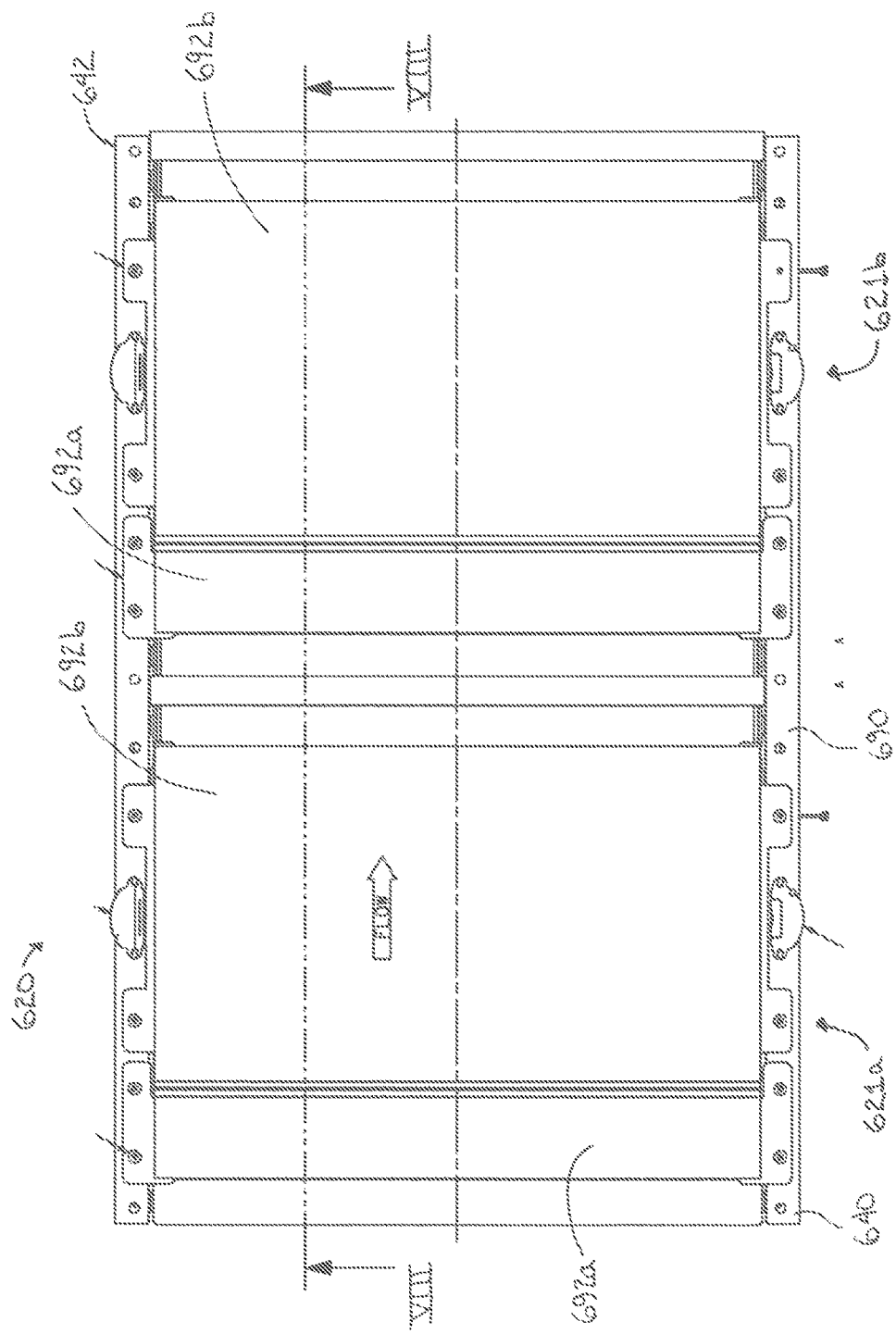
FIG. 6 is a top plan view of the conveyor of FIG. 5 shown with the belt removed.
Figure 7:
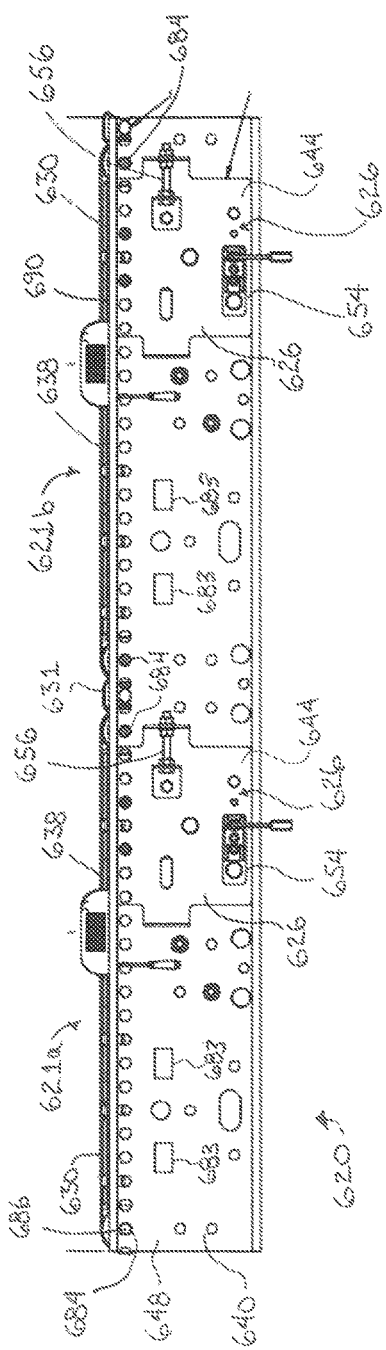
FIG. 7 is a side elevation view of the conveyor of FIG. 5.

As understood from FIG. 6 slider pans or slider pan assemblies 692a, 692b are disposed at or adjacent top edge 690 between idler rollers 634, 636 and beneath belt 630, with slider pan 692 slidingly supporting belt 630 to convey objects there along. Slider pan assembly 692 may be constructed to include a plastic layer disposed over a support plate, with the support plates being mounted to the side frames 640, 642, and with the plastic layers comprise an ultra-high-molecular-weight ("UHMW") polymeric material that is treated with a lubricant, as discussed above. Alternative constructions and configurations of slider pan assemblies may also be employed to provide the low resistance to sliding of the inner surface of belt 630 over the slider pan assemblies, as also discussed above.

In the illustrated embodiment, conveyor 620 includes a pair of identical zones 621a, 621b that each include a drive system 622, with the belts 630 of each zone 621a, 621b separated by a bridge 631 to span the gap there between. Each zone can be configured to be between approximately twenty-four to thirty-six inches in length, with a width of approximately seventeen to thirty-three inches. It should be appreciated, however, that various configurations of conveyor 620 may be provided by way of the separation distance between idler rollers 634, 636.

Still further, as with conveyor 520, conveyor 620 may be advantageously used in incline or decline arrangements whereby conveyor 620 is oriented to convey objects in either a generally upward or downward orientation. Likewise, in particular embodiments of an angled incline or decline conveyor 620, when the conveyor 620 is stopped with objects thereon that the resistance of driven roller 624 from rotating, together with the resistance imparted by belt tension assemblies 626, 628, may itself be sufficient to prevent unwanted movement. Alternatively, a one-way clutch in the case of incline applications or a brake in the case of decline applications may be incorporated into conveyor 620 to inhibit unwanted motion of belt 630 when driven roller 624 is not activated to drive belt 630. In the case of a brake, for example, the brake may be actuated or engaged whenever driven roller 624 is stopped or deactivated.

Referring now to FIGS. 12-14, an alternative conveyor 720 is illustrated that includes multiple conveyor segments 721, each of which include an alternative belt drive system 722 in accordance with a further embodiment of the present invention. Conveyor 720 includes various similar components and features to conveyor 520 and belt drive system 522 discussed above, with the similar components of conveyor 720 being identified with "200" added to the like reference numerals of conveyor 520. It should be appreciated that due to the similarity of conveyor 720 with conveyor 520, not all of the similar components and features are discussed with respect to the system of FIGS. 5-11.

Drive belt system 722 includes a drive or driven roller 724 and a tension system or assembly that includes a tensioner mount comprising a pair of opposed belt tension assemblies 726, 728 with an endless conveyor belt 730 disposed about drive roller 724 and a tension roller 732 disposed between tension assemblies 726, 728 to thereby impart a desired tension to belt 730 and thus define or operate as a tension system or assembly for conveyor 720. Belt 730 is further disposed about multiple conveyor rollers 734 that along with belt 730 form a conveying surface 738 for objects to be moved by conveyor 720. Conveyor 720 may be used, for example, as a horizontal conveyor or as an incline conveyor, such as at up to approximately 18 degrees of inclination. When operated at an incline a roller of one or more of the conveyor segments 721, such as one of the aforementioned rollers, may be provided with a one-way bearing whereby when the driven roller 724 is stopped the belt 730 is prevented from moving in an opposite direction that might otherwise be caused by the weight of objects on the conveying surface. For example, the idler rollers 836 of the segments 721 may be provided with a one-way bearing such that rollers 836 only roll in one direction, that being the flow direction. Conveyor segments 721 may then be used to accumulate objects, or goods thereon.

As with roller 524, drive roller 724 comprises a self-driven motorized drive roller and is mounted to the frame of conveyor, such as between side frames 740, 742, as well as between mounting plates 744, 746 associated with tension assemblies 726, 728, respectively. Side frames 740, 742 have generally outwardly oriented C-shaped profiles with vertical portions 748, 750 to which mounting plates 744, 746 are mounted, with mounting plates 744, 746 being disposed on outwardly oriented sides of the respective side frames 740, 742. In the illustrated embodiment side frames 740, 742 are the same as side frames 540, 542, and thus include repeating patterns of apertures 783, 753 therein that may be used for mounting tension assemblies 726, 728.

Figure 16:
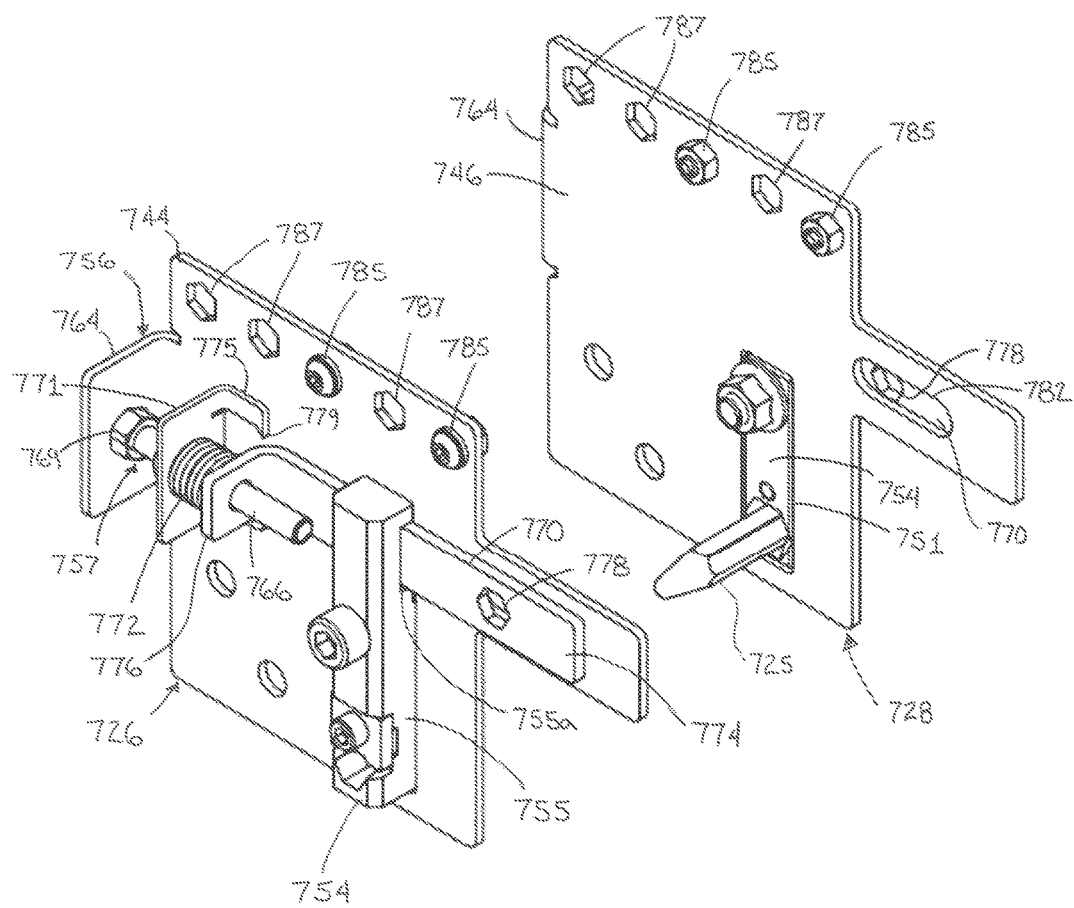
FIG. 16 is a perspective view of a pair of tension assemblies for the drive system of the conveyor of FIG. 12.

In the illustrated embodiment tension assemblies 726, 728 are substantially similar, with assembly 728 shown in FIGS. 15 and 16 being a mirror image of assembly 726. Due to their similarities, the present discussion primarily focuses on tension assembly 726. It should therefore be appreciated that the discussion applies equally to the structure and operation of tension assembly 728.

Roller 724 includes a shaft 752 that is mounted between side frames 740, 742 and mounting plates 744, 746, with roller 724 being secured between frames 740, 742 via roller shaft mounts 754. As understood with reference to tension assembly 728 of FIG. 16, plate 746 includes an aperture 751 at which shaft mount 754 is disposed, with plate 744 similarly including such an aperture 751 at which the shaft mount 754 of tension assembly 726 is disposed. When tension assemblies 726, 728 are mounted to side frames 740, 742, the apertures 751 of plates 744, 746 are positioned over selected ones of apertures 753 in frame portions 748, 746 (see FIGS. 13 and 14).

Roller shaft mounts 754 in the embodiment of FIGS. 12-19 may also comprise mounts as disclosed in U.S. Pat. No. 7,243,784, but as shown are vertically oriented relative to shaft mount 554 shown in FIG. 1. In the illustrated embodiment roller 724 includes a single drive motor having power cord 723 that extends out of the roller shaft mount 754 of tension assembly 726, with roller shaft mount 754 of tension assembly 728 including a shaft hub 725 (FIG. 16) that extends into shaft 752 of roller 724. Alternatively, drive roller 724 may be configured to have a drive motor with a power cord extending out the opposite tension assembly, or may comprise a motorized driven roller having two drive motors. It should be appreciated that FIG. 16 illustrates the tension assemblies 726, 728 in general alignment orientation as they would be when mounted to respective vertical portions 748, 750 of side frames 740, 742.

Referring now to FIGS. 16-19, in addition to mounting plate 744, belt tension assembly 726 includes a biased shaft mount 756, with ends of tension roller 732 mounted between biased shaft mount 756 and the biased shaft mount of tension assembly 728 to thereby bias tension roller 732 for imparting tension to belt 730.

Shaft mount 756 includes a flange or leg portion 764, which in the illustrated embodiment is formed with and extends outwardly from plate 744, such as at a generally right angle there from. A tensioner 757 comprising a rod or threaded member, such as a screw or bolt 766 is passed through a hole in flange 764, with bolt 766 being fixed to or against flange 764 by nut 769 opposite head 767 of bolt 766. Still further, the bolt 766 is engaged with a shaft support 770 that is configured as an L-shaped member having a first leg 774 and a second leg 776 with an end of bolt 766 passing through a hole in leg 776 to allow shaft support 770 to move relative to or slide along bolt 766. Leg 774 includes a hexagon shaped aperture 778 for receiving the shaft 780 of tension roller 732.

Tensioner 757 further includes a spring plate 771 and a compression spring 772, where spring 772 is disposed about bolt 766 and compressed between plate 771 and leg 776 of shaft support 770. Spring plate 771 is held in place on bolt 766 and adjustably moveable along the length of bolt 766 via adjustment nut 773. Spring 772 thus imparts an adjustable biasing force on shaft support 770 by way of spring 772 being fixed against spring plate 771 and pushing on leg 776 of shaft support 770, where spring plate 771 is adjustable along the length of bolt 766 to adjust the amount of biasing force. Shaft support 770 is thus slidable along plate 744 while supporting tension roller 732. As best understood from FIGS. 16 and 19, leg 774 of shaft support 770 is additionally supported by shaft mount 754, with mount 754 including a base 755 having a guide aperture 755a. Base 755 thus defines a guide for shaft support 770.

Still further, spring plate 771 includes a pair of spaced apart alignment guides or tabs 775, where guides 775 are oriented at a right angle to plate 771 such that guides 775 are slidable along plate 744. As best understood from FIG. 17, guides 775 include indicator ends 779 that may be used as gauges or guides as to the relative amount of compression being applied to spring 772, and thus biasing force to tension roller 732 and tension on belt 730. For example, the position of ends 779 relative to leg 776 may be visually observed or measured, including for both tension assemblies 726, 728 on either side of conveyor 720 to promote and/or confirm that a balanced tensioning force is applied to belt 730.

As best understood from tension assembly 728 of FIG. 16, plate 746 includes an elongate aperture 782 configured as a horizontally oriented slot with shaft support 770 being located proximate thereto, and in particular with aperture 778 of shaft support 770 being aligned with the elongate aperture 782 of the plate 746. Plate 744 likewise includes such an elongate aperture 782, which is shown covered by shaft support 770 in FIGS. 16 and 17. When assembled, the shaft 780 of tension roller 732 is thus moveable or positionable or adjustable within and along elongate apertures 782 of the plates 744, 746.

Still further, as best understood from FIGS. 13 and 14, side frames 740 and 742 include elongate apertures 783, with the elongate apertures 782 of plates 744, 746 configured to be aligned with selected apertures 783 of side frames 740, 742 when plates 744, 746 are mounted thereto. As noted, shaft 780 of tension roller 732 is mounted within apertures 778 of the shaft supports 770. Elongate apertures 782 and 783 thus enable tension roller 732 to be moved there along to be pushed against belt 730. In the illustrated embodiment, tension roller 732 is movable in an orientation that is generally parallel to the belt conveying surface 738.

Still further, the outer cylindrical surface of drive roller 724 is crowned whereby it has a varying diameter about its length, with roller 724 having a slightly larger diameter in the middle relative to the diameter of the roller 724 at or adjacent the two ends. Tension assemblies 726, 728, in addition to providing proper tension to belt 730, thus along with the crowned surface of roller 724 aid in promoting the proper tracking of belt 730.

Referring now to FIGS. 13 and 14, idler conveyor rollers 735 are mounted between side frames 748, 750, with side frames 748, 750 including apertures 784 that receive shafts of conveyor rollers 735. As shown, conveyor rollers 735 are mounted such that their outer perimeter extends above a top edge of side frames 748, 750. Conveyor rollers 735 include a pair of distal end idler rollers 734, 736 that define the first incoming roller and last outgoing roller of a given conveyor section 721. Of note is that in the illustrated embodiment end idler rollers 734, 736 are beneficially formed to be completely cylindrical and thus true cylinders. In contrast with other roller conveyor arrangements the first incoming roller and/or last outgoing roller may be formed with one or more deformations or crowns that are used to promote the tracking of a belt conveyor thereabout. These deformations or crowns, however, can disorient objects being conveyed there over, including repeatedly disorient objects as the object is conveyed from conveyor segment-to-segment. This disorientation of objects can cause problems with the conveyor system, such as causing problems with automatically reading codes on the objects and/or discharging the objects from the conveyor system.

Drive system 722 thus operates to drive belt 730 about idler rollers 734, 736, with belt 730 disposed or passing around the outer cylindrical surfaces of conveyor rollers 735, as well as over the outer cylindrical surfaces of driven roller 724 and tension roller 732. Moreover, frames 748, 750 include multiple apertures 784, as shown, whereby rollers 735 may be mounted in various locations along frames 748, 750, including to adjust the length between rollers 734, 736. It should be further appreciated that tension assemblies 726, 728 may be disposed in various locations along side frames 748, 750. Still further, plates 744, 746 include apertures 787 that align with apertures 784 of side frames 748, 750, respectively, for mounting plates 744, 746 thereto, such as via fasteners 785. As understood from FIG. 14, the axes of idler rollers 734, 736 define a plane, with the axis of drive roller 724 and the axis of tension roller 732 being beneath or lower than the plane defined by the axes of idler rollers 734, 736 in a normal or perpendicular orientation from the plane relative to the conveying surface 738 of conveyor 720. Still further, in the illustrated embodiment, the axes of drive roller 724 is additionally lower or beneath the axes of tension roller 732 relative to conveying surface 738. As further understood from FIG. 12, idler roller 734 comprises an initial or incoming roller and idler roller 736 comprises an end or outgoing roller for the conveying surface 738, with tension roller 732 being biased in a parallel orientation relative to conveying surface 738.

Figure 20A:
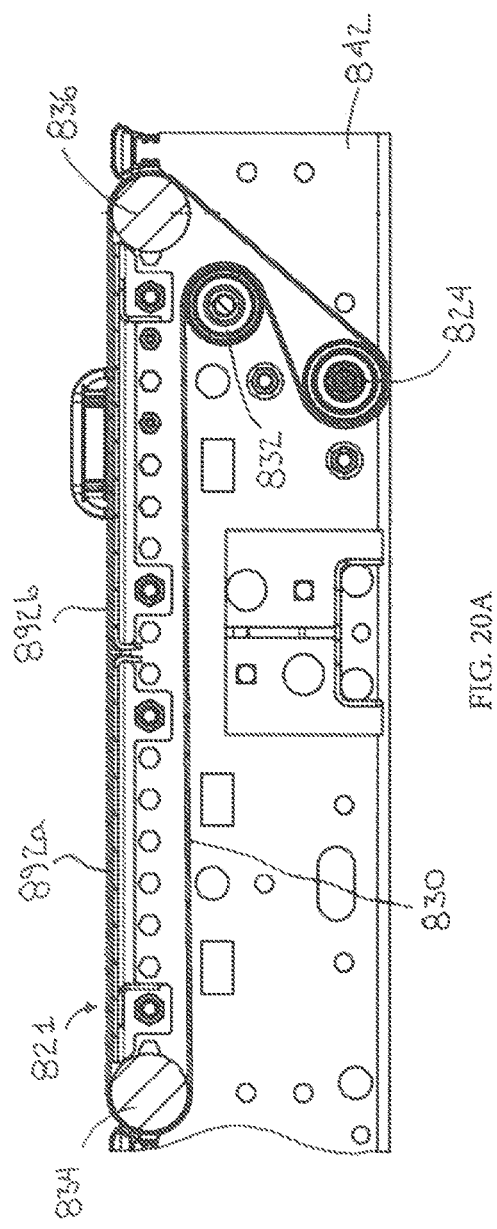
FIGS. 20A and 20B are a side elevation view s of an alternative conveyor using the tension assemblies of FIG. 16.
Figure 20B:
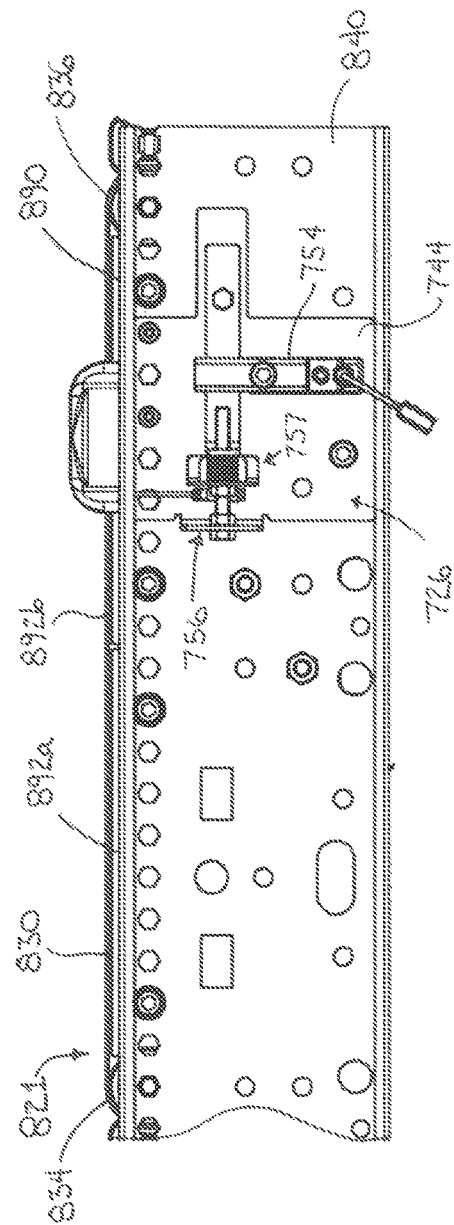
Figure 21:
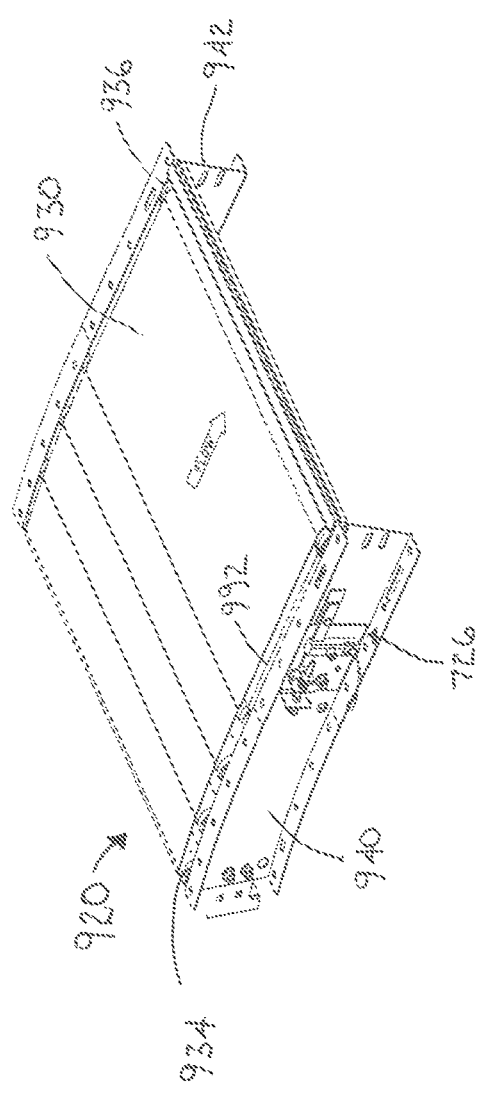
FIG. 21 is a perspective view of an alternative conveyor having a drive system for a belt conveyor in accordance with the present invention.
Figure 22:
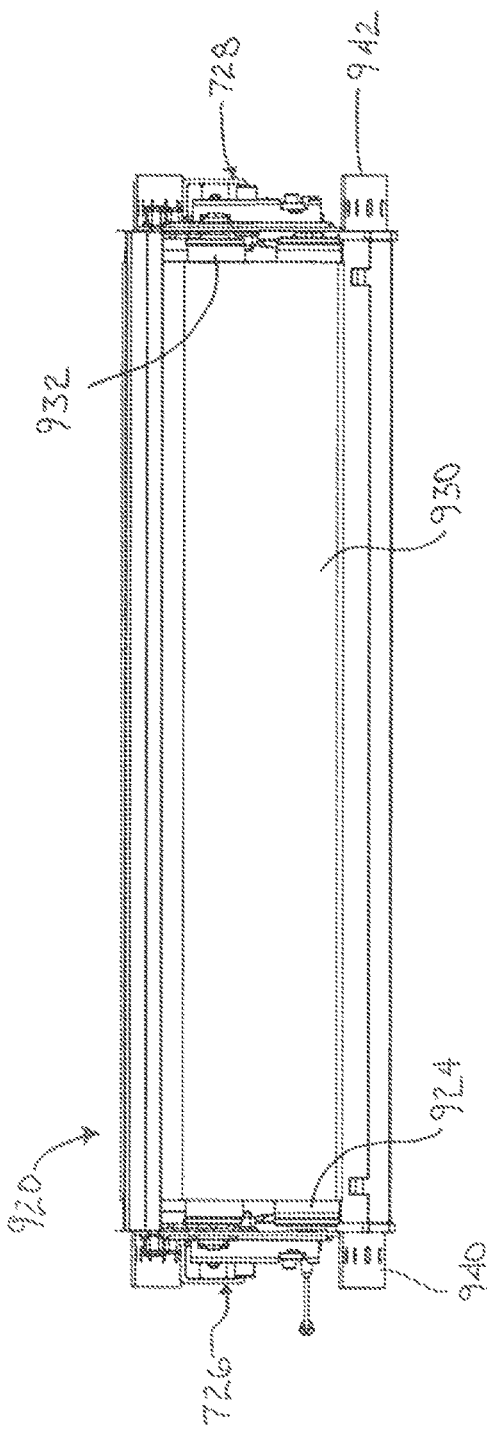
FIGS. 22 and 23 are an end view and a side view of the conveyor of FIG. 21.
Figure 23:
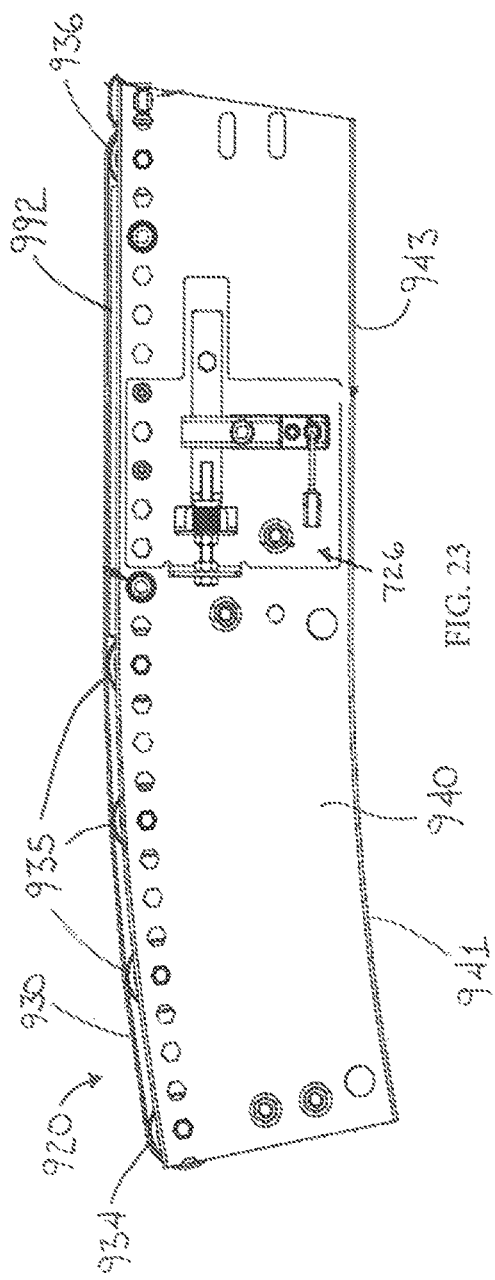
Figure 24:
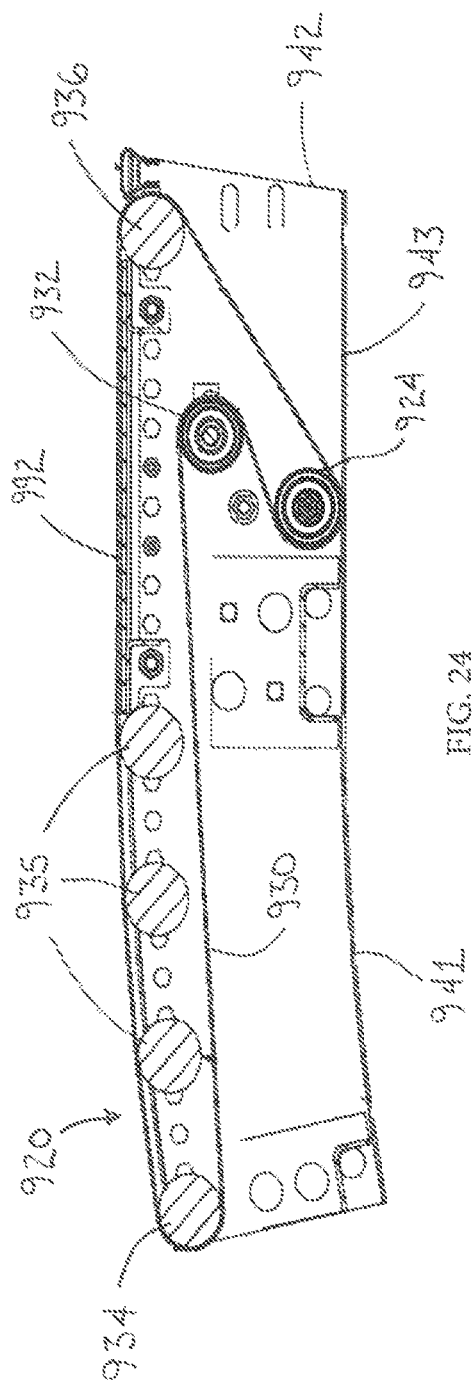
FIG. 24 is a side sectional view of the conveyor of FIG. 21.

Referring now to FIGS. 20A and 20B, an alternative conveyor or conveyor segment 820 is illustrated that is substantially similar to conveyor 520 discussed above, but instead utilizes the above discussed tension assemblies 726, 728 and with the "300" added to the like reference numerals of conveyor 520. Due to the similarity of conveyor 820 with conveyor 520, not all of the similar components and features are discussed with respect to the system of FIGS. 20A-20B. As shown, conveyor 820 includes a pair of idler rollers 834, 836, as well as a motorized drive roller 824 and a tension roller 832, about which belt 830 is driven. Slider pans 892a, 892b are disposed at or adjacent the top edge 890 of frames 840, 842 between idler rollers 834, 836 and beneath belt 830, with slider pans 892a, 892b slidingly supporting belt 830 to convey objects there along. Conveyor 820 may be used as a horizontal or decline conveyor, such as declining at downward angles of down to approximately 18 degrees, where the objects would flow downwardly from left to right relative to the view of FIGS. 20A and 20B. Moreover, when drive roller 824 is stopped with objects on belt 830, the friction between slider pans 892a, 892 and belt 830 when objects are located on belt 830 may be sufficient to prevent the belt 830 from inadvertently moving without drive roll 824 being activated. The objects, or goods, may then accumulate on the conveyor 820.

Yet a further alternative conveyor or conveyor segment 920 in accordance with aspects of the present invention is illustrated in FIGS. 21-24, where conveyor segment 920 comprises a transitional nose over conveyor such as may be used at the transition from an incline conveyor to a horizontal conveyor, such as when transitioning from an inclination of anywhere between five to eighteen degrees to a horizontal conveyor. Conveyor segment 920 may thus be used at the discharge end of a conveyor 720 that is upwardly inclined, with conveyor segment 920 discharging in transition to a horizontally oriented conveyor.

Conveyor 920 includes a drive system substantially similar to conveyor 720, including a self-driven motorized drive roller 924 and a tension roller 932 mounted between tension assemblies 726, 728 mounted to conveyor side frames 940, 942. As understood from FIGS. 23 and 24, conveyor 920 includes an arched or curved portion 941 and a straight portion 943, along with a pair of distally located end idler rollers 934, 936. Also included are idler conveyor rollers 935 at curved portion 941 and a slider pan 992 at straight portion 943, where belt 930 passes over rollers 935 and slider pan 992, as well as end rollers 934, 936 to define a conveying surface.

The drive systems with tension systems of the present invention beneficially enable objects to be transported by conveyors with reduced tension on the conveyor belts relative to a conventional conveyor belt arrangement, thereby requiring less power to operate the conveyors, reducing the stress on the various rollers, including the drive rollers, and increasing the useful life of the components of the conveyor. Moreover, the conveyors are able to handle higher payloads. Still further, the belts of the conveyor systems may be laced belt constructions whereby different zone or conveyor segment lengths may be readily formed, such as up to approximately six feet in length.

In the illustrated embodiments, the motorized drive or driven rollers may comprise motorized drive rollers ("MDRs") provided by Dematic Corp. of Grand Rapids, Mich. Still further, drive rollers of differing diameters and torques may be employed, as well as alternatively driven drive rollers. It should thus be appreciated that the conveyor systems of the present invention are scalable based on different motor technology.

Although the illustrated embodiment is shown to incorporate a pair of belt tension assemblies on either side of a tension roller, an alternative embodiment may be configured in which a tension assembly is employed only on one side, such as at either side frame. Other changes and modifications in the specifically described embodiments can be carried out without departing from the principles of the present invention which is intended to be limited only by the scope of the appended claims, as interpreted according to the principles of patent law including the doctrine of equivalents.

The invention claimed is:

1. A belt conveyor, said belt conveyor comprising:
   a belt for conveying items thereon;
   a frame, said frame including a pair of side frames between which said belt is moved for conveying items;
   a pair of idler rollers about which said belt is disposed for movement, with said belt defining a conveyor surface between said pair of idler rollers whereby said pair of idler rollers define end idler rollers of the belt conveyor;
   a tension roller, said tension roller being biased into engagement with said belt; and
   a driven roller, said driven roller operative to drive said belt about said end idler rollers and said tension roller; wherein a rotational axis of said tension roller and a rotational axis of said driven roller are disposed lower than a plane defined by the rotational axes of said end idler rollers in a normal orientation from the plane relative to said conveying surface, wherein said driven roller is mounted between said side frames with the rotational axis of said driven roller being disposed lower than the rotational axis of said tension roller in a normal orientation relative to the plane defined by the rotational axes of said end idler rollers, and wherein said belt extends for movement directly between one of said end idler rollers and said driven roller.

2. The belt conveyor of claim 1, wherein said tension roller is mounted to said frame between said side frames by a tensioner mount, and wherein said tensioner mount biases said tension roller against said belt in a generally parallel orientation relative to said conveying surface.

3. The belt conveyor of claim 2, wherein said tensioner mount comprises a tension assembly mounted to one of said side frames, and wherein said tension assembly comprises a tensioner supporting an end of said tension roller and wherein said tensioner is adjustable to selectively adjust the position of said tension roller into engagement with said belt.

4. The belt conveyor of claim 2, wherein said tensioner mount comprises a pair of tension assemblies with each of said pair of tension assemblies mounted to respective ones of said side frames, and wherein said pair of tension assemblies each comprise a tensioner supporting respective ends of said tension roller and wherein said tensioners are adjustable to selectively adjust the biasing force on said tension roller into engagement with said belt.

5. The belt conveyor of claim 4, wherein each said tensioner further comprises a shaft support and a spring engaged with said shaft support, wherein a shaft of said tension roller is mounted to and between said shaft supports with said springs providing a biasing force to said tension roller via said shaft supports.

6. The belt conveyor of claim 5, wherein each said tensioner further comprises a rod with said springs disposed over said rods and said rods engaged with said shaft supports, and wherein said pair of tension assemblies each include a flange to which a respective said rod is mounted.

7. The belt conveyor of claim 1, wherein a plurality of conveyor rollers are disposed between said end idler rollers with said conveyor rollers supporting said belt to define said conveyor surface.

8. The belt conveyor of claim 1, wherein at least one slider pan is disposed between said end idler rollers with said slider pan supporting said belt to define said conveyor surface.

9. The belt conveyor of claim 1, wherein said end idler rollers are cylindrical and free from crowns.

10. The belt conveyor of claim 1, wherein said driven roller comprises a motorized self-driven roller.

11. A belt conveyor, said belt conveyor comprising a plurality of belt conveyor segments, and wherein said belt segments are configured as belt conveyors according to claim 1 in end-to-end arrangement.

12. A belt conveyor, said belt conveyor comprising:
a belt for conveying items thereon;
a frame, said frame including a pair of side frames between which said belt is moved for conveying items, wherein said side frames each include longitudinally extending vertical portions;
a pair of idler rollers about which said belt is disposed for movement, with said belt defining a conveyor surface between said pair of idler rollers, with said pair of idler rollers being mounted to and between said vertical portions of said side frames;
a tension roller, said tension roller being biased into engagement with said belt;
a driven roller, said driven roller operative to drive said belt about said pair of idler rollers and said tension roller; and
a pair of tension assemblies, wherein said pair of tension assemblies each comprise a mounting plate mounted to respective ones of said vertical portions of said side frames with said tension roller and said driven roller being mounted between said vertical portions of said side frames and to and between said mounting plates, and wherein said pair of tension assemblies each comprise a tensioner supporting respective ends of said tension roller and wherein said tensioners are adjustable to selectively adjust the biasing force on said tension roller into engagement with said belt.

13. The belt conveyor of claim 12, wherein each said tensioner further comprises a spring with said springs providing biasing force to said tension roller in an orientation that is generally parallel to said conveyor surface.

14. The belt conveyor of claim 13, wherein each said tensioner further comprises a shaft support with said springs engaged with said shaft supports, wherein a shaft of said tension roller is mounted to and between said shaft supports with said springs providing a biasing force to said tension roller via said shaft supports.

15. The belt conveyor of claim 14, wherein each said tensioner further comprises a rod with said springs disposed over said rods and said rods engaged with said shaft supports, and wherein said mounting plates each include a flange to which a respective said rod is mounted.

16. The belt conveyor of claim 12, wherein a rotational axis of said tension roller and a rotational axis of said driven roller are disposed lower than a plane defined by the rotational axes of said pair of idler rollers in a normal orientation from the plane relative to said conveying surface.

17. The belt conveyor of claim 12, wherein said pair of idler rollers comprise end idler rollers and wherein said end idler rollers are cylindrical and free from crowns, and wherein a plurality of conveyor rollers are disposed between said end idler rollers with said conveyor rollers supporting said belt to define said conveyor surface and/or at least one slider pan is disposed between said end idler rollers with said slider pan supporting said belt to define said conveyor surface.

18. The belt conveyor of claim 12, wherein said vertical portions of each said side frame include apertures through which said tension roller and said driven roller are mounted to respective ones of said mounting plates.

19. A belt conveyor having a pair of side frames supporting a plurality of belt segments wherein said belt segments comprise:
a belt for conveying items thereon with said belt being moved between said pair of side frames for conveying items, with said side frames each including longitudinally extending vertical portions;
a pair of idler rollers mounted between said side frames and about which said belt is disposed for movement, with said belt defining a conveyor surface between said pair of idler rollers, with said pair of idler rollers being mounted to and between said vertical portions of said side frames;
a tension roller mounted between said side frames, said tension roller being biased into engagement with said belt; and
a driven roller mounted between said side frames, said driven roller comprising a motorized self-driven roller and being operative to drive said belt about said pair of idler rollers and said tension roller; and
a pair of tension assemblies, wherein said pair of tension assemblies each comprise a mounting plate mounted to respective ones of said vertical portions of said side frames with said tension roller and said driven roller being mounted between said vertical portions of said side frames and to and between said mounting plates, and wherein said pair of tension assemblies each comprise a tensioner supporting respective ends of said tension roller and wherein said tensioners are adjustable to selectively adjust the position of said tension roller into engagement with said belt, and wherein a rotational axis of said tension roller and a rotational axis of said driven roller are disposed lower than a plane defined by the rotational axes of said pair of idler rollers in a normal orientation from the plane relative to said conveying surface, and wherein said driven roller comprises a motorized self-driven roller.

20. The belt conveyor of claim 19, wherein said driven roller is mounted with the rotational axis of said driven roller disposed lower than the rotational axis of said tension roller in a normal orientation relative to the plane defined by the axes of said pair of idler rollers.

\* \* \* \* \*